(12) United States Patent
Miller

(10) Patent No.: US 7,096,804 B2
(45) Date of Patent: Aug. 29, 2006

(54) FLUID DISTRIBUTION ASSEMBLY HAVING BLEED GROOVE FOR LEAKAGE

(75) Inventor: James Anton Miller, Cedar Falls, IA (US)

(73) Assignee: American Soil Technologies, Inc., Pacoima, CA (US)

( * ) Notice: Subject to any disclaimer, the term of this patent is extended or adjusted under 35 U.S.C. 154(b) by 0 days.

(21) Appl. No.: 11/057,738

(22) Filed: Feb. 14, 2005

(65) Prior Publication Data

US 2005/0178304 A1 Aug. 18, 2005

Related U.S. Application Data

(63) Continuation-in-part of application No. 10/350,847, filed on Jan. 24, 2003, now Pat. No. 6,874,436.

(51) Int. Cl.
*A01C 23/04* (2006.01)

(52) U.S. Cl. .................... 111/128; 137/625.15

(58) Field of Classification Search ........... 137/625.15, 137/625.11, 625.21–625.24, 625.16, 625.19, 137/625.31, 625.32, 625.46, 625.47; 111/128, 111/118

See application file for complete search history.

(56) References Cited

U.S. PATENT DOCUMENTS

| 1,117,333 | A | 11/1914 | Cooper |
|---|---|---|---|
| 1,171,277 | A | 2/1916 | Thayer |
| 1,359,177 | A | 11/1920 | Knight |
| RE15,151 | E | 7/1921 | Knight |
| 1,424,728 | A | 8/1922 | Knight et al. |
| 1,871,529 | A | 8/1932 | Karshner |
| 2,072,331 | A | 3/1937 | Hanna |
| 2,139,306 | A | 12/1938 | Gaffney |
| 2,384,469 | A | 9/1945 | Kalix |
| 2,649,060 | A | 8/1953 | Hawkins et al. |
| 2,649,061 | A | 8/1953 | Hawkins et al. |
| 2,845,884 | A | 8/1958 | Clausing et al. |
| 2,866,422 | A | 12/1958 | Colson |
| 2,876,718 | A | 3/1959 | Vaughan |
| 2,975,735 | A | 3/1961 | Purvance |
| 3,025,806 | A | 3/1962 | Peck |
| 3,143,090 | A | 8/1964 | Cecil et al. |
| 3,211,114 | A | 10/1965 | Ucinhaska |
| 3,602,166 | A | 8/1971 | Peterson |

(Continued)

FOREIGN PATENT DOCUMENTS

DE 225866 6/1909

(Continued)

*Primary Examiner*—Christopher J. Novosad

(57) ABSTRACT

The fluid distribution discs include a plurality of fluid distribution channels that radiate from the fluid distribution disc origin to conically shaped tines connected at the perimeter of the fluid distribution disc. The fluid distribution channels are aligned with similar channels within a bushing securable to the fluid distribution disc radial portion. A stationary plate or disc valve has a disc valve fluid channel in a disc valve radial surface, which is in contact with the rotating bushing radial surface resulting in a periodic alignment between the disc valve fluid channel and each of the bushing channels. Fluid is pumped to a fluid port in a hub having a fluid port in fluid communication with the disc valve fluid channel. As the tines of the fluid distribution disc penetrate the field surface, fluid is channeled through the disc valve into the fluid distribution disc channels and the tines. Fluid leakage from disc valve radial surface/rotating bushing radial surface interface is captured and redirected by a bleed groove though the tines at point after a tine has entered the ground and before the fluid is delivered to the tine through the disc valve fluid channel.

6 Claims, 24 Drawing Sheets

U.S. PATENT DOCUMENTS

| | | |
|---|---|---|
| 3,716,005 A | 2/1973 | Fennell |
| 3,926,131 A | 12/1975 | Collens |
| 4,034,686 A | 7/1977 | Collins |
| 4,649,836 A * | 3/1987 | Overocker ............... 111/128 |
| 4,677,921 A | 7/1987 | Brown |
| 4,919,060 A | 4/1990 | Cady |
| 5,107,895 A | 4/1992 | Pattison et al. |
| 5,178,078 A | 1/1993 | Pendergrass |
| 5,353,724 A | 10/1994 | Wheeley |
| 5,769,169 A | 6/1998 | Mikstiz |
| 2002/0056554 A1 | 5/2002 | Hargraves et al. |

FOREIGN PATENT DOCUMENTS

| | | |
|---|---|---|
| FR | 1107575 | 8/1958 |
| GB | 643395 | 9/1950 |

\* cited by examiner

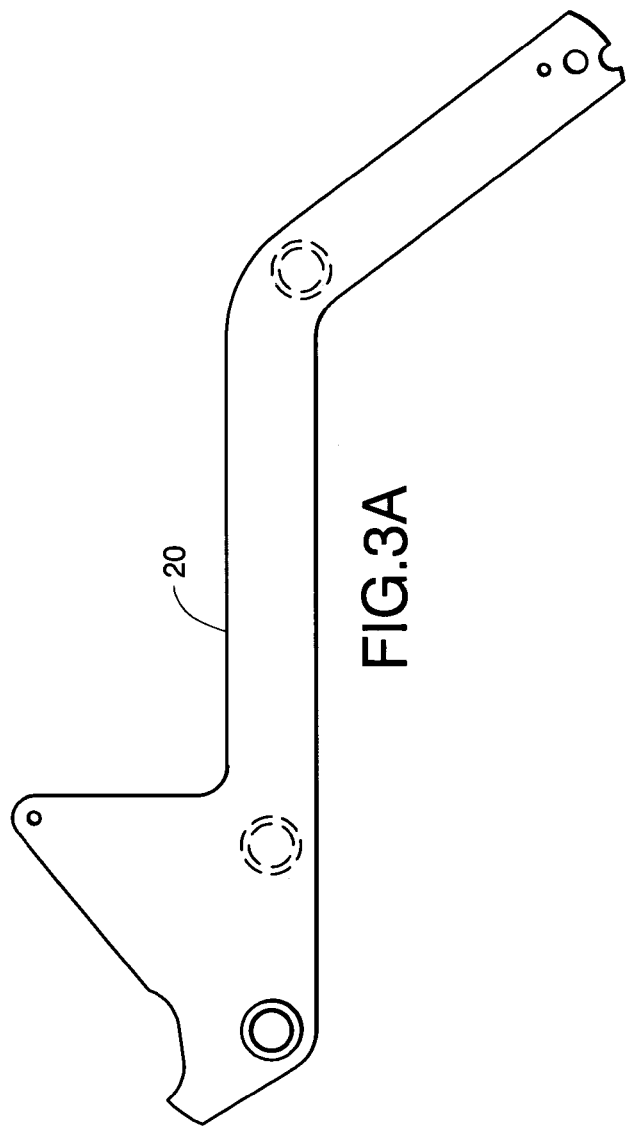
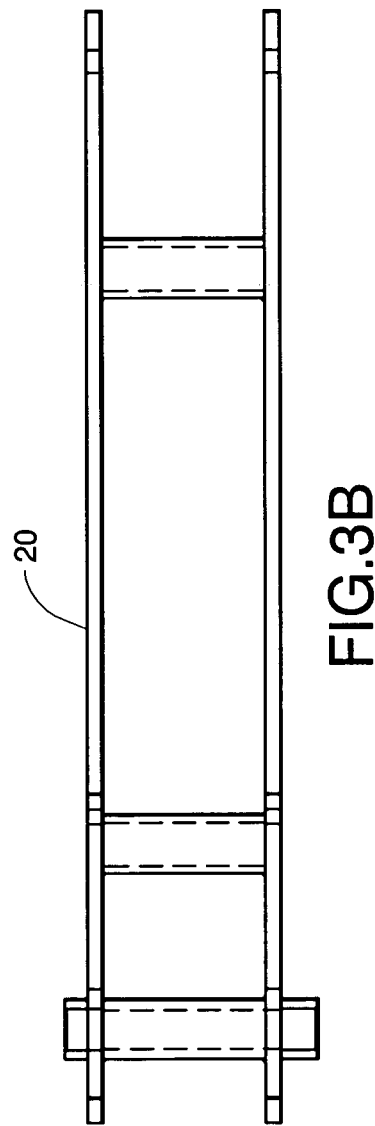
FIG.3A
FIG.3B

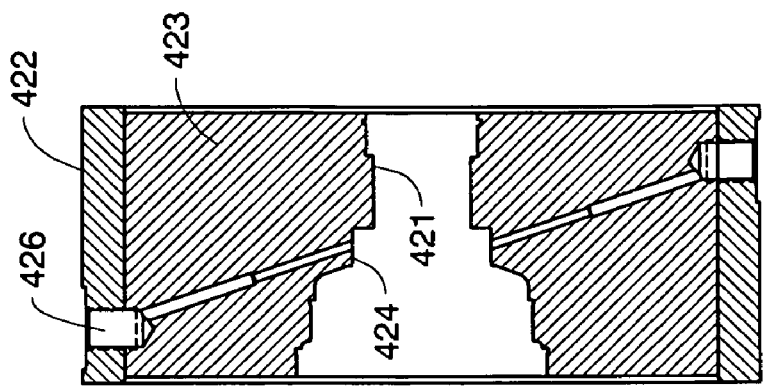
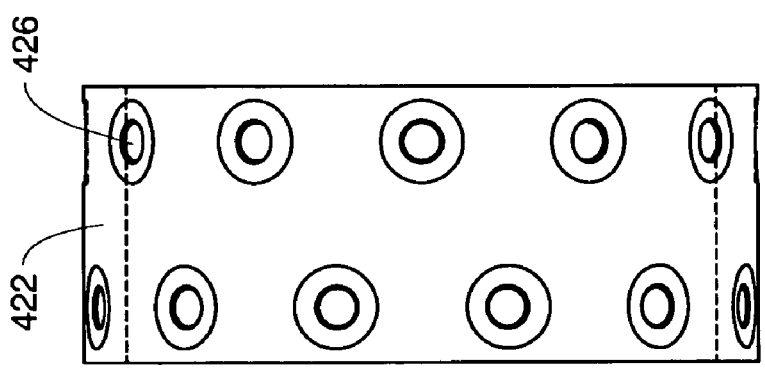
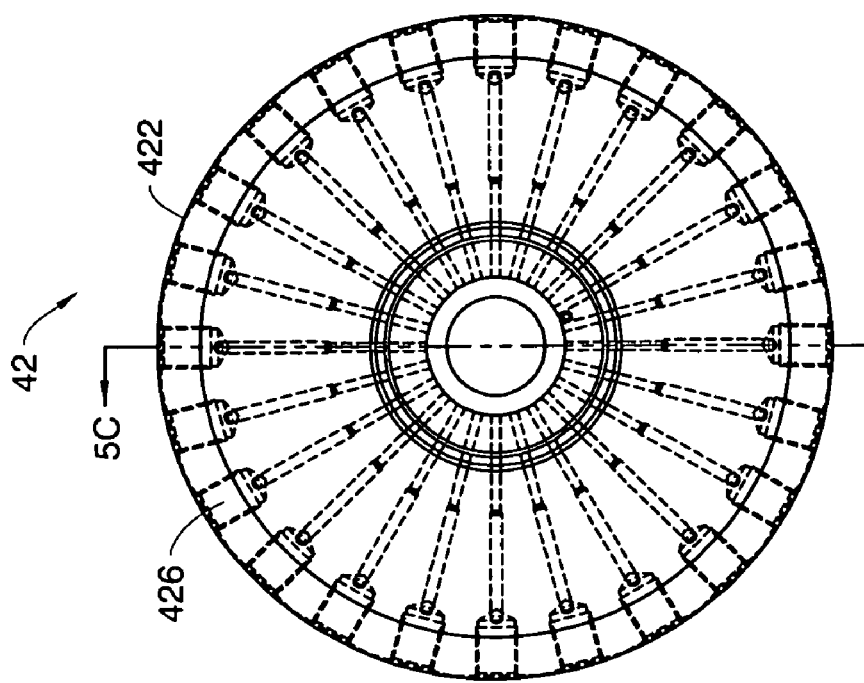
FIG.5C
FIG.5B
FIG.5A

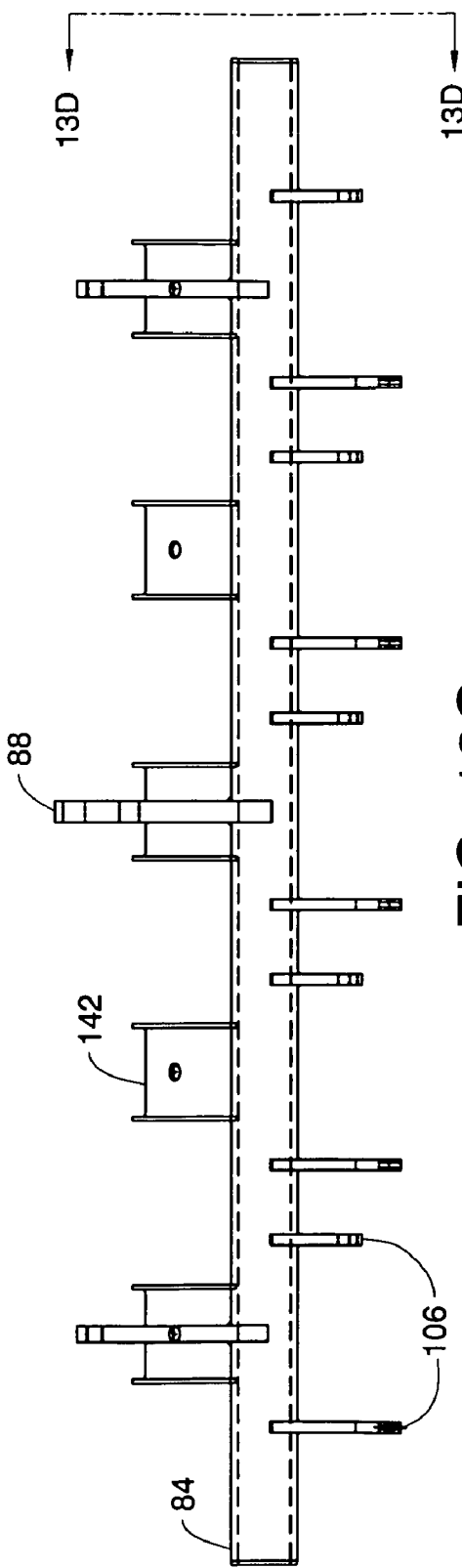
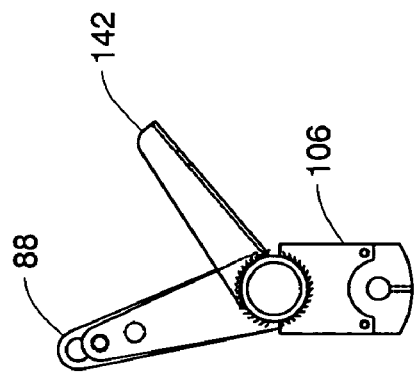

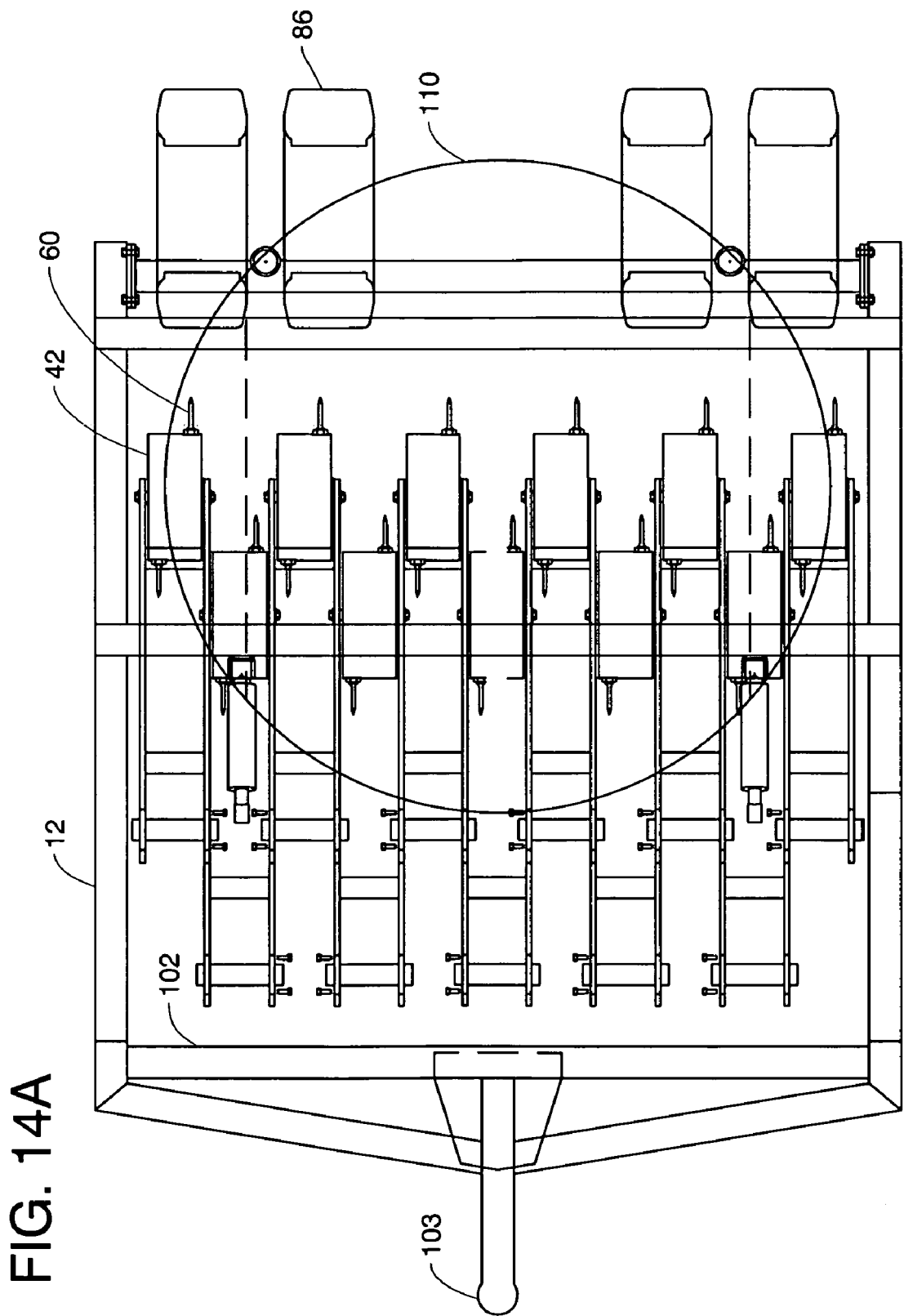

FLUID DISTRIBUTION ASSEMBLY HAVING BLEED GROOVE FOR LEAKAGE

CROSS-REFERENCE TO RELATED APPLICATIONS

The present application is a continuation-in-part application of application Ser. No. 10/350,847 filed Jan. 24, 2003 now U.S. Pat. No. 6,874,436 by inventors Carl Ranno, et al. entitled "Fluid Distribution Assembly." The present application is also related to U.S. Pat. No. 6,796,252 entitled "Fluid Injection Apparatus Having Lift Assembly Shaft Levers", filed by inventors Carl Ranno, et al. on Jan. 24, 2003 and U.S. Pat. No. 6,848,376 entitled "Fluid Injection Apparatus Having Frame Levers," filed by inventors Carl Ranno, et al. on Jan. 24, 2003.

BACKGROUND OF THE INVENTION

1. Field of the Invention

This invention is relevant to the field of soil treatment apparatuses.

2. Discussion of the Related Art

Fertilizer is a common and preferred treatment used in modern agriculture. Liquid fertilizers are often preferred for their ease of delivery to agricultural roots systems. Prior apparatus are disclosed in the following United States or foreign patents; U.S. patent application No. 200256554 J W Hargraves et al., U.S. Pat. No. 5,769,169 F J Mikstiz, U.S. Pat. No. 5,353,724 R B Wheeley, Jr., U.S. Pat. No. 5,178,078 D B Pendergrass, U.S. Pat. No. 4,919,060 W F Cady, U.S. Pat. No. 4,677,921 M A Brown, U.S. Pat. No. 4,649,836 L Overocker, U.S. Pat. No. 4,677,921 M J Kordon, U.S. Pat. No. 4,034,686 W C Collens, U.S. Pat. No. 3,926,131 W C Collens, U.S. Pat. No. 3,716,005 J W Fennell, U.S. Pat. No. 3,602,166 M L Peterson, U.S. Pat. No. 3,211,114 B Ucinhaska, U.S. Pat. No. 3,143,090 R D Cecil et al., U.S. Pat. No. 3,025,806 A W Peck, U.S. Pat. No. 2,975,735 W T Purvance, U.S. Pat. No. 2,876,718 J B Vaughan, U.S. Pat. No. 2,866,422 R L Colson, U.S. Pat. No. 2,845,884 P K Clausing et al., FR1107575 De Lomine et al., U.S. Pat. No. 2,649,060 C A Hawkins et al., U.S. Pat. No. 2,649,061 C A Hawkins et al., GB643395, U.S. Pat. No. 2,384,469 J Kalix, U.S. Pat. No. 2,139,306 C Gaffney, U.S. Pat. No. 2,072,331 W R Hanna, U.S. Pat. No. 1,871,529 G C Karshner, U.S. Pat. No. 1,424,728 H Knight et al., U.S. Pat. No. RE15151 H Knight, U.S. Pat. No. 1,359,177 H Knight, U.S. Pat. No. 1,171,277 H D Thayer, U.S. Pat. No. 1,117,333 W Cooper, DE225866 A Lucht, U.S. Pat. No. 5,107,895. However, none of the above patents however disclose the aspects of the current invention.

SUMMARY OF THE DESCRIPTION

The invention is summarized below only for purposes of introducing embodiments of the invention. The ultimate scope of the invention is to be limited only to the claims that follow the specification.

The invention is incorporated in a fluid injection apparatus. The apparatus is propelled or towed in a longitudinal direction over a field and the apparatus components engage the field surface to inject fluid beneath the field surface. Generally, the apparatus comprises a frame and at least one series of transversely distributed fluid distribution discs rotationally coupled at distal end portions of an arm assemblies pivotally suspended from the frame. The fluid distribution discs include a plurality of fluid distribution channels that radiate from the fluid distribution disc origin to conically shaped tines connected at the perimeter of the fluid distribution disc. The fluid distribution channels are aligned with similar channels within a bushing securable to the fluid distribution disc radial portion. A stationary plate or disc valve has a disc valve fluid channel in a disc valve radial surface, which is in contact with the rotating bushing radial surface resulting in a periodic alignment between the disc valve fluid channel and each of the bushing channels. Fluid is pumped to a fluid port in a hub having a fluid port in fluid communication with the disc valve fluid channel. As the tines of the fluid distribution disc penetrate the field surface, fluid is channeled through the disc valve into the fluid distribution disc channels and the tines connected thereto.

The description of the invention which follows, together with the accompanying drawings should not be construed as limiting the invention to the example shown and described, because those skilled in the art to which this invention appertains will be able to devise other forms thereof within the ambit of the appended claims.

BRIEF DRAWING DESCRIPTIONS

The drawings depict one or more embodiments incorporating one or more aspects of the invention but are not determinative of the scope of the claims that follow this description.

FIG. 1A illustrates a first alternate embodiment of the apparatus;

FIG. 1B illustrates a side view of the first alternate embodiment of apparatus in a fluid injection orientation characterized by the fluid distribution discs 42 in contact with the ground surface 2 and the tines 60 penetrating the ground surface 2;

FIG. 1C illustrates a side view of the first alternate embodiment of apparatus in a traveling orientation characterized by neither the fluid distribution discs 42 nor the tines 60 in contact with the ground surface 2;

FIG. 2A illustrates a side view of an arm assembly 20 embodiment coupled to the fluid distribution disc 42 at one distal end and the lift assembly shaft 84 at the other distal end;

FIG. 3A illustrates a side view of an alternative arm assembly 20 of the embodiment;

FIG. 3B illustrates a top view of the arm assembly 20 of the embodiment

FIG. 5A illustrates a side view of the fluid distribution disc 42;

FIG. 5B illustrates a front view of the fluid distribution disc 42;

FIG. 5C illustrates a forward view cutaway of the fluid distribution disc 42;

FIG. 13C illustrates a front view of a rear lift assembly shaft 104;

FIG. 13D illustrates a side view of the rear lift assembly shaft 104;

FIG. 14A illustrates a top view of a second alternative embodiment of the apparatus;

DESCRIPTIONS OF EMBODIMENTS

Figure 1A:
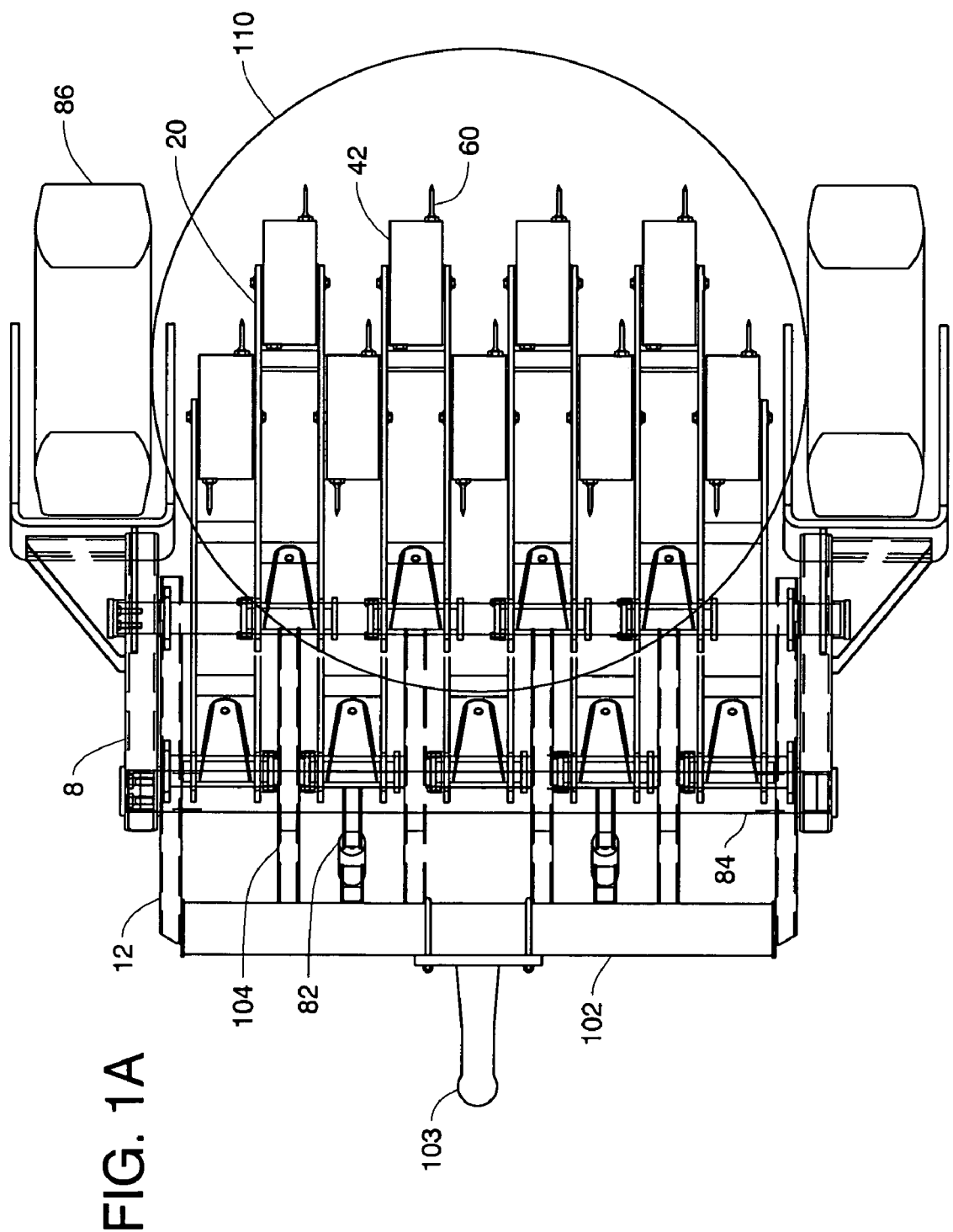

It is to be understood that the descriptions below are merely illustrative of the presently preferred embodiments of the invention and that no limitations are intended to the detail of construction or design herein shown other than as defined in the appended claims.

Each apparatus described herein is referred to as a fluid injection apparatus as this combination of terms best describes the intended and preferred use of each embodiment described below. For ease of description, each apparatus generally comprises a frame, one or more arm assemblies 20, and one or more fluid distribution discs 42 coupled by the arm assemblies 20 to the frame. The fluid distribution discs 42 further have tines 60 coupled to the perimeter of the fluid distribution discs 42 through which fluid is pumped. Soil injection with a described embodiment of the apparatus comprises moving the apparatus over a field while the tines 60 of the fluid distribution discs 42 sequentially pierce the ground 2 or field surface that is injected with fluid. Fluid as described herein contemplates all compositions in which molecules pass easily over each other; however, a liquid solution will be presumed for the description below since liquid solutions will be the most common fluids used with the present invention. As used herein, "longitudinal" generally refers to the direction traveled by the apparatus when it is being propelled over a ground surface 2 to be injected.

Figure 1B:
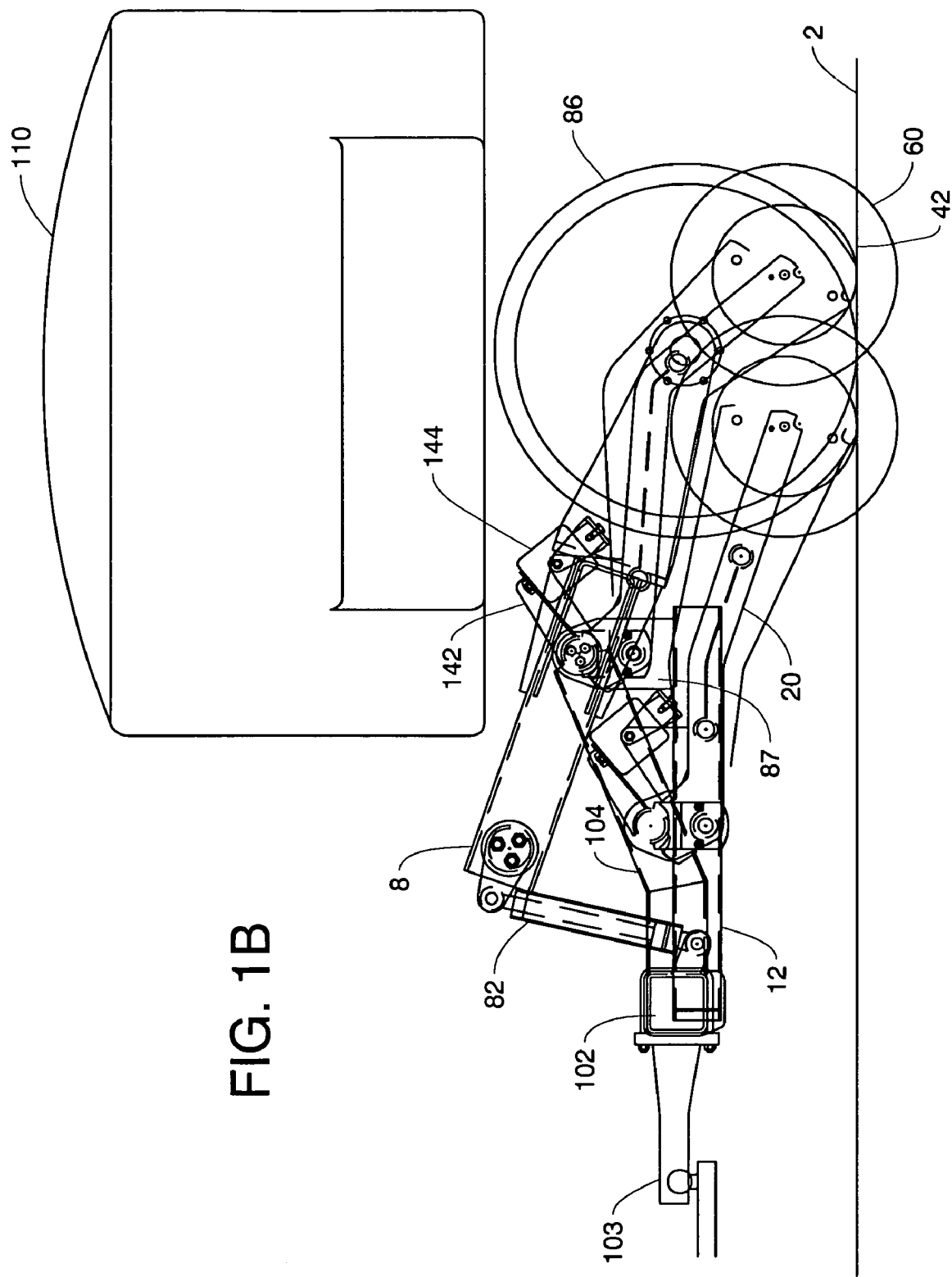
Figure 1C:
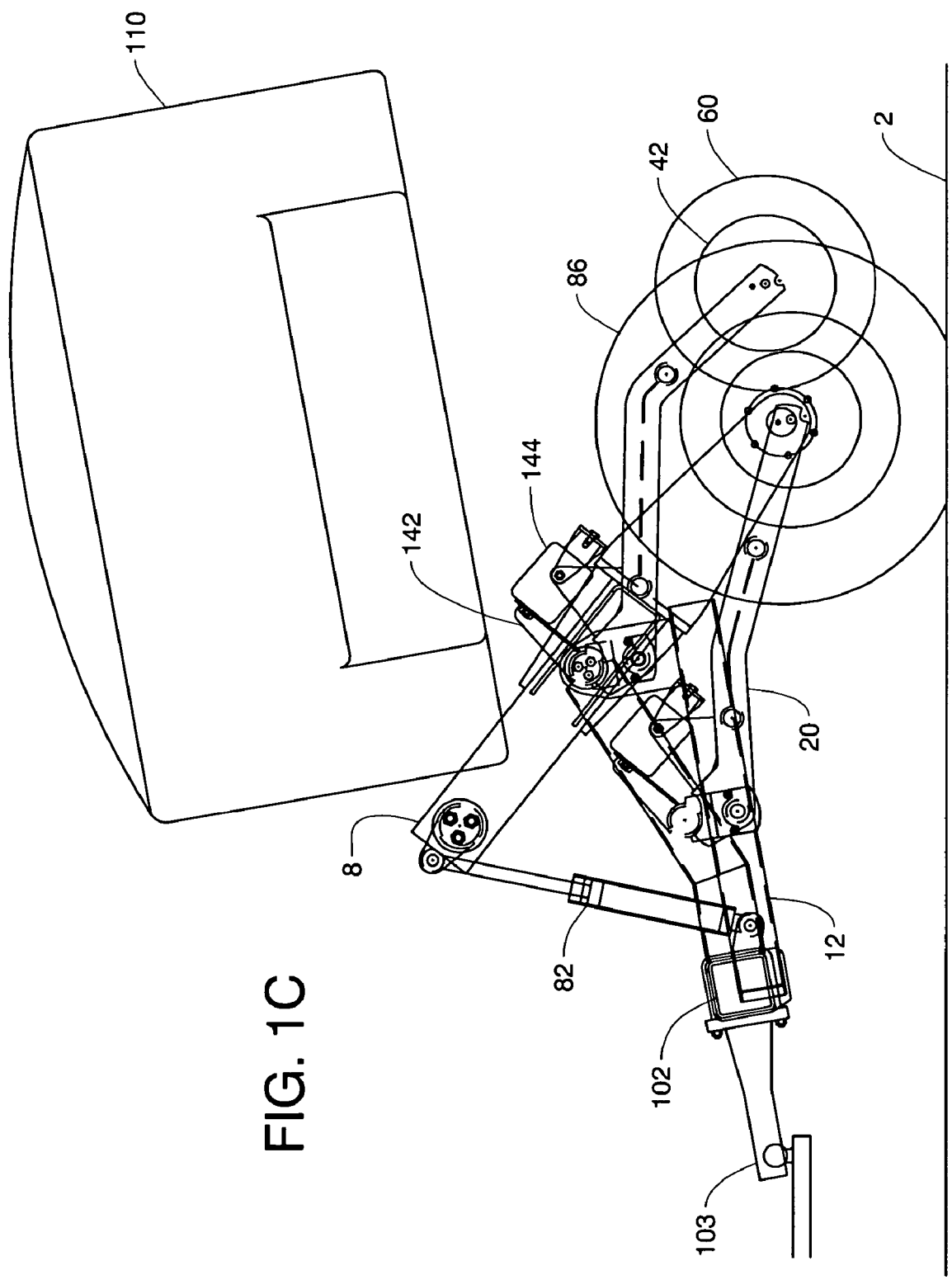

The frame of the apparatus provides the skeletal structure for the components of the apparatus. Though not specifically limited thereto, it is contemplated and preferred that common agricultural vehicles will tow the apparatus. As such, a first preferred frame is illustrated in FIGS. 1A–1C and includes two longitudinal frame beams 12 having forward end portions that are secured at distal forward ends to a transverse forward frame brace 102. A receiving hitch 103 is connected to the forward frame brace 102 and provides a connection point from which the apparatus is propelled or towed.

Secured to and extending longitudinally rearward from the forward frame brace 102 at a slight positive angle relative to the longitudinal frame beams 12 are a plurality of lift assembly brackets 104. See FIG. 1B. First and second lift assembly shafts 84 perpendicularly traverse and are pivotally supported by the lift assembly brackets 104. Additionally, the distal ends of the lift assembly brackets 104 are buttressed by a support plate 87 secured substantially vertically between the lift assembly shaft 84 and the rear end portions of the two longitudinal frame beams 12.

The preferred lift assembly shaft 84 further includes arm assembly forks 106 extending downward between which arm assemblies 20 can be pivotally suspended. Each arm assembly 20 comprises a pair of joined parallel beams between which a fluid distribution disc 42 is rotationally securable, the first end portions of each pair being pivotally suspended from an arm assembly fork 106 such that the length of the beams are oriented rearward in the longitudinal direction. The pivotal suspension of each arm assembly 20 from the frame 10 enables each arm assembly 20 to "float" its associated fluid distribution discs 42 on the field or ground surface when the apparatus is engaged in fluid injection operation.

Two arm assembly 20 designs are preferred for apparatus designs having two or more rows of fluid distribution discs 42. The two preferred alternative designs each have first beam portions angled along the longitudinal orientation relative to second beam portions. The first beam portions correspond to the end pivotally suspended from the arm assembly fork 106 and the second beam portions correspond to the second distal ends coupled to a fluid distribution disc 42. A first row of fluid distribution discs 42 will be coupled to the frame 10 using an arm assembly 20 having beam portions with first angle and the second row of fluid distribution discs 42 will be coupled to the frame 10 using an arm assembly 20 having beam portions with the second greater angle. In both cases, the arm assemblies 20 are angled downward toward the ground surface. FIGS. 1B & 1C illustrate side views of the first preferred fluid injection apparatus using two arm assemblies 20 described.

Figure 2A:
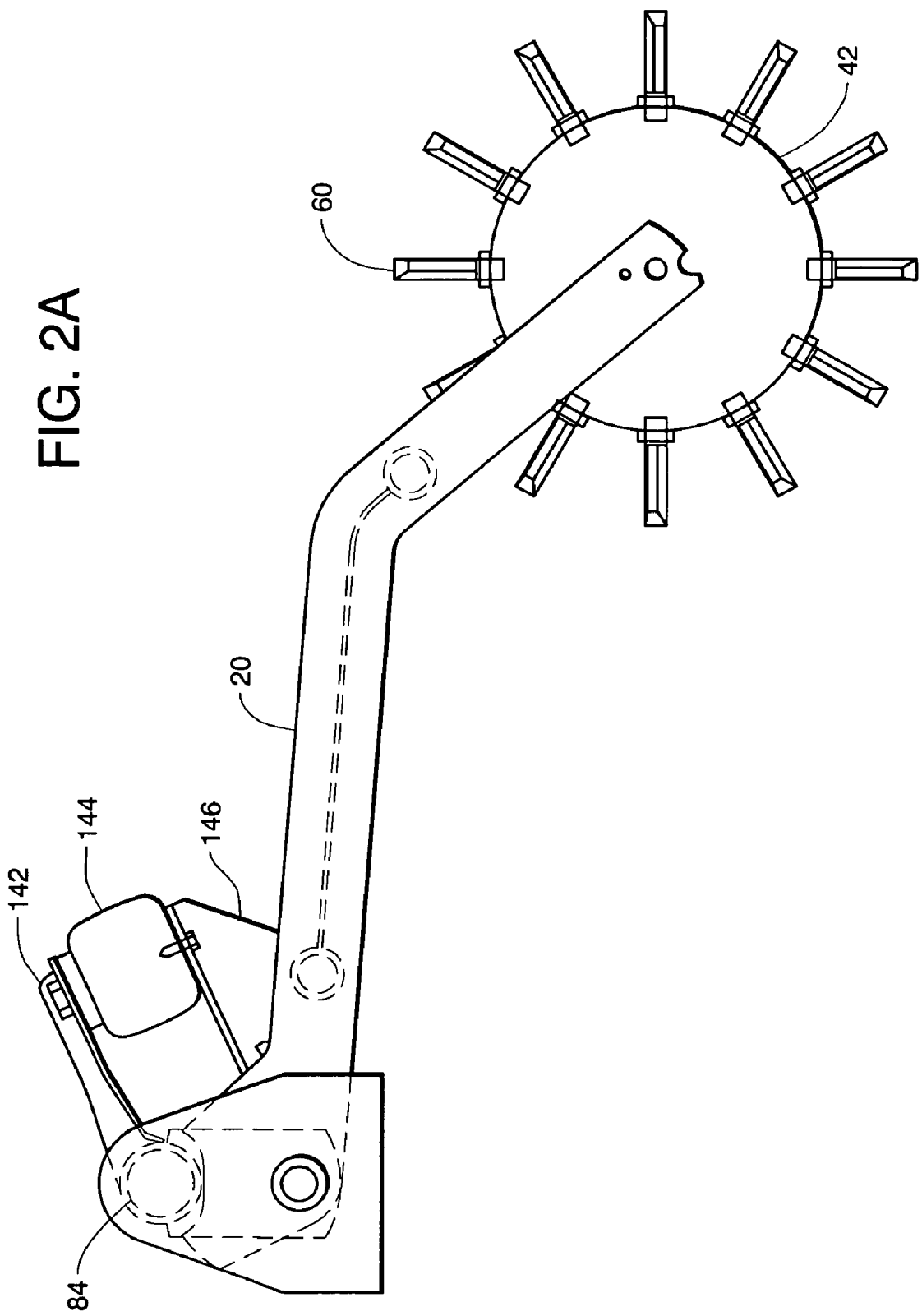
FIG. 2B illustrates a top view of an arm assembly 20 of the embodiment.
Figure 2B:
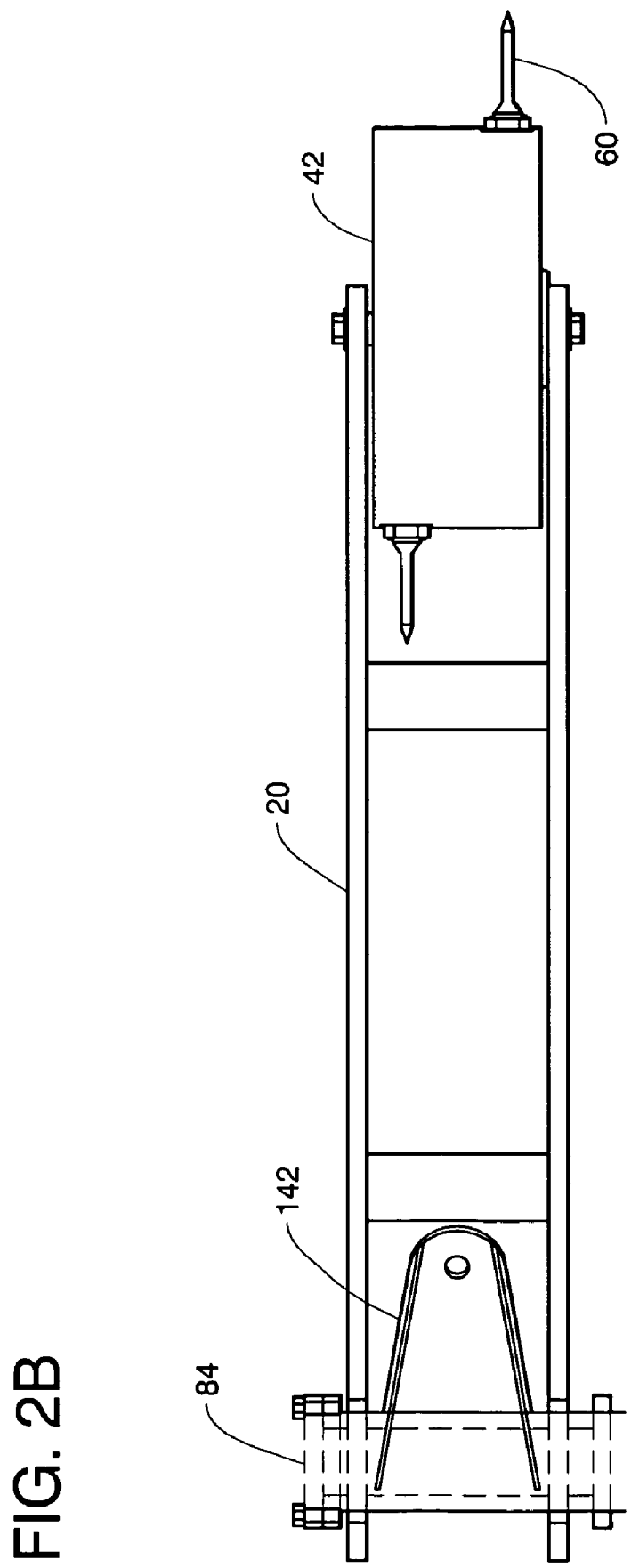

Though the arm assemblies 20 are pivotally suspended from the lift assembly shafts 84, it is preferred that the arm assemblies 20 be biased downward towards the ground surface 2 to aid in sufficient tine 60 penetration. It follows that the lift assembly shafts 84 have a plurality of biasing brackets 142 extending slightly upward and rearward partially over the end portion of the arm assemblies 20. Mechanical biasing members or air springs 144 provide the preferred downward biasing force for the arm assemblies 20 and are interposed between each biasing bracket 142 and each arm assembly 20. The air spring 144 is biased against the arm assemblies 20 via an air spring brace 146 either statically secured to the arm assembly 20 beam as illustrated in FIG. 2A or suspended from an extension of the arm assembly as illustrated in the inset in FIG. 2A.

The first preferred embodiment further includes first and second longitudinal levers 8 that extend substantially the length of the frame and that are each pivotally coupled at medial positions to the second lift assembly shaft 84. See FIGS. 1A–1C. The levers 8 are also each pivotally coupled at forward distal end portions to a controllable hydraulic cylinder 82 interposed and pivotally coupled in a substantially vertical orientation between the forward distal ends of the first and second longitudinal levers 8 and the forward frame brace 102. Large traveling wheels 86 are coupled at the rearward distal end portions of the chassis levers 8. Extending the controllable hydraulic cylinder 82 forces the chassis levers 8 upward thereby elevating the frame components and the fluid distribution discs 42 off the ground surface and resting the mass of the apparatus on the frame and the traveling wheels 86. Further, since the arm assemblies 20 are pivotally suspended from the lift assembly shaft 84, the arm assemblies 20 are prevented from complete revolutions about the shaft 84 by limited extendibility of the mechanical biasing member (i.e. the air spring 144) or alternatively from a brake extending from the shaft that contacts the arm assembly to halt complete rotation of the arm assembly. This elevated orientation is illustrated in FIG. 1C and facilitates transporting the apparatus to and from the field that is to be treated while avoiding contact of the fluid distribution discs 42 with the ground surface or roads. In contrast, compressing the controllable hydraulic cylinder 82 allows the levers 8 to descend thereby allowing the frame components to descend and the fluid distribution discs 42 to contact the ground surface.

Figure 4A:
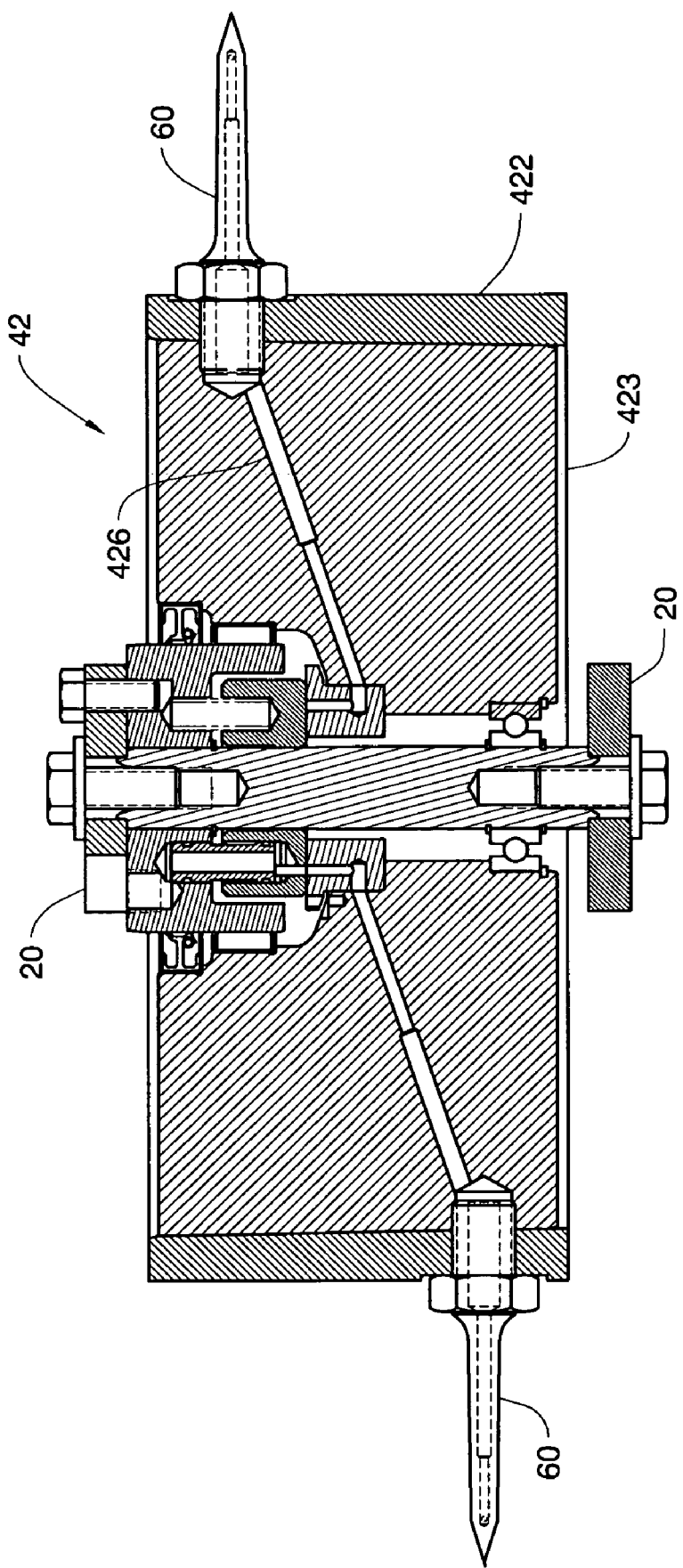
FIG. 4A illustrates a side view cutaway of a fluid distribution disc 42.
Figure 4B:
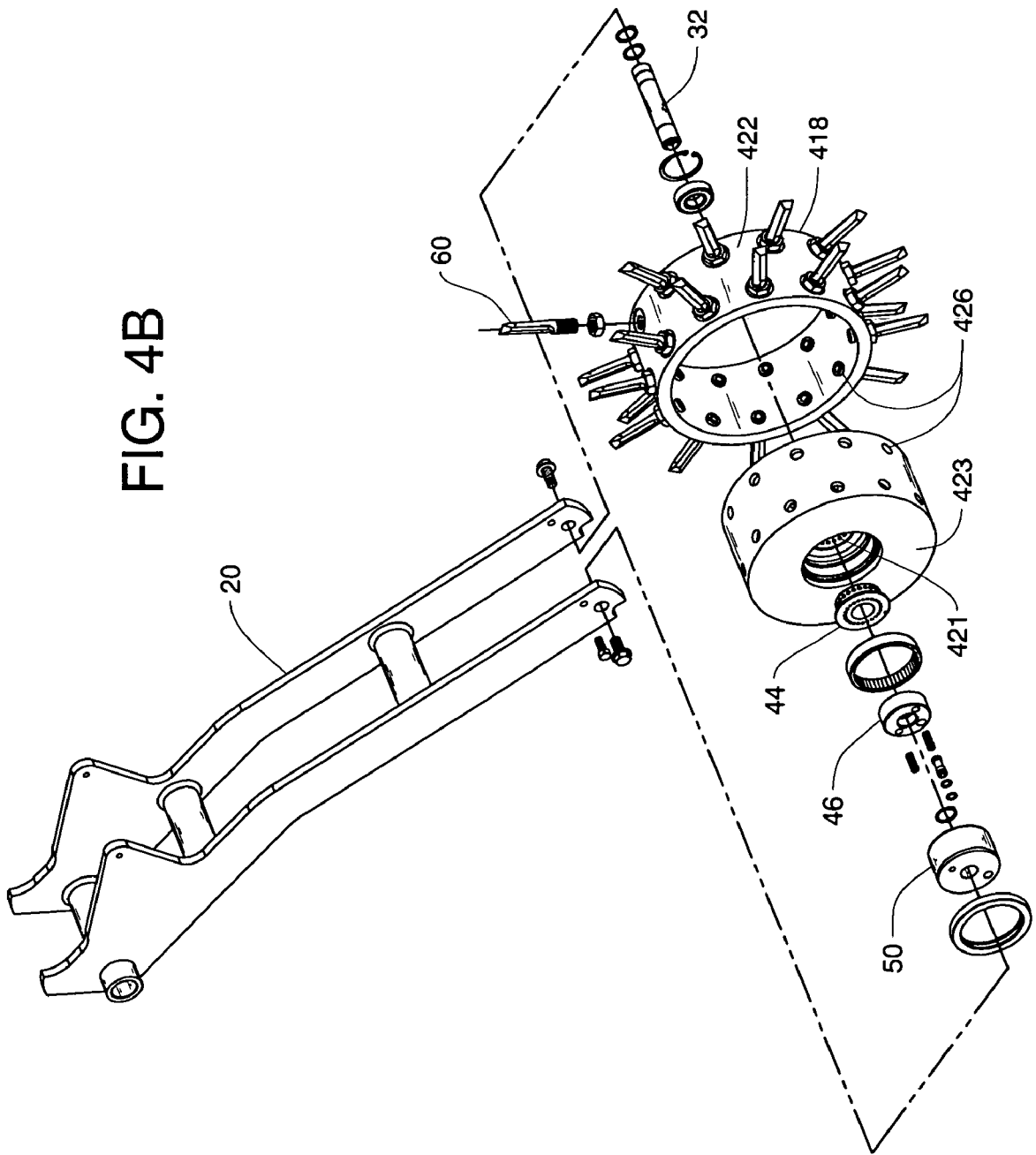
FIG. 4B illustrates a exploded perspective view of the fluid distribution disc 42.
Figure 4C:
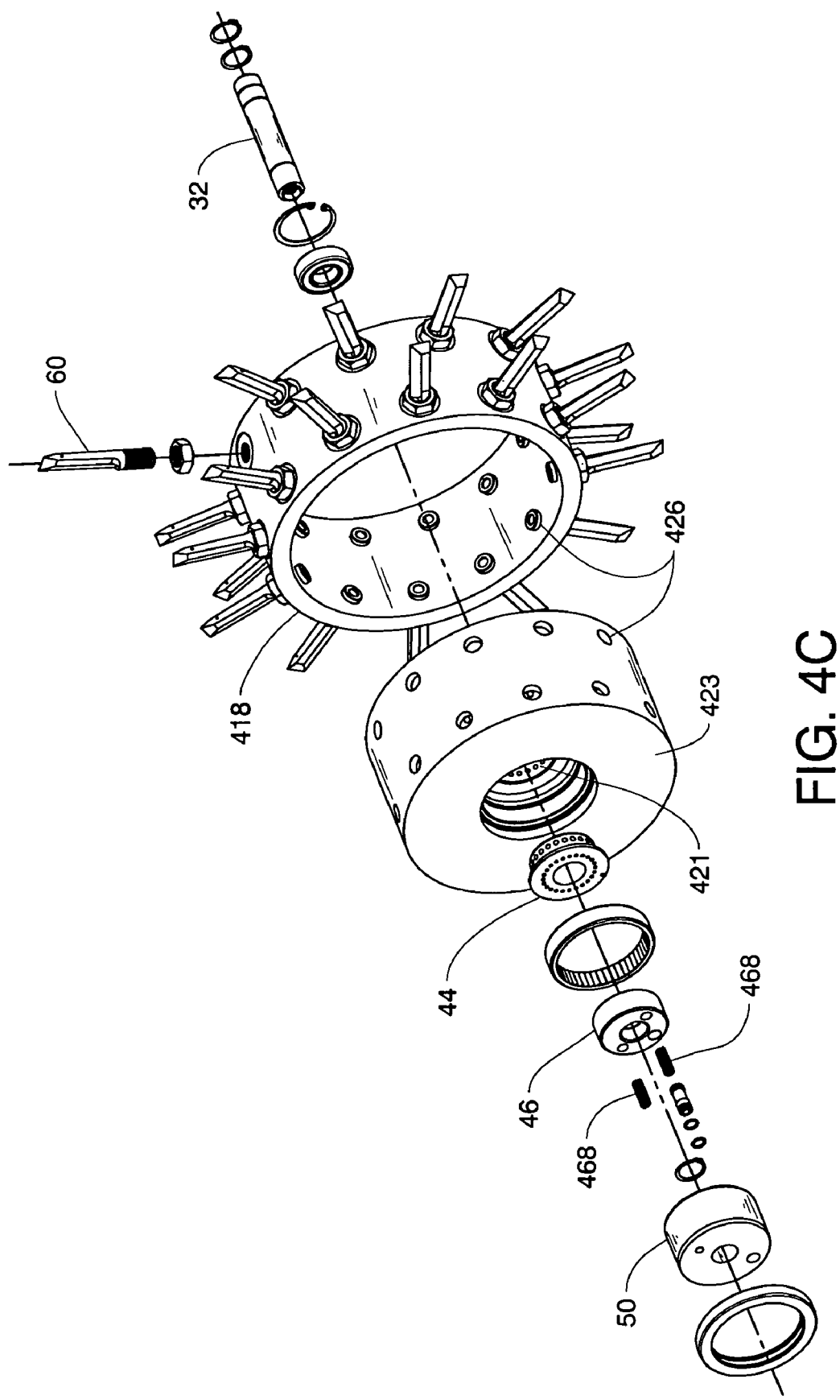
FIG. 4C illustrates a closer exploded perspective view of the fluid distribution disc 42.

An axle 32 is rotationally coupled at the second distal end or end portion of each arm assembly 20 and couples the fluid distribution components to the arm assemblies 20. As described herein, the fluid distribution components are illustrated in FIG. 4A–4C and comprise a fluid distribution disc 42, a bushing 44 coupled to the fluid distribution disc 42, a plate or disc valve 46 in contact with the bushing 44. A hub 50 attaches to the axle 32 end and secures the plate or disc valve 46 in place. The axle 32 penetrates the origin of each of the fluid distribution disc 42, the bushing 44, the disc valve 46, and the hub 50. Each of these components are "stacked" on the axle 32 and secured inside the arm assembly 20 beam portions using one or more bolts.

The fluid distribution disc 42 comprises an inner rim surface 421, an outer perimeter surface 422; and an interior surface 424 in fluid-communication with the outer perimeter surface 422 via a plurality of fluid distribution disc channels 426. The inner rim surface 421 rotates concentrically about the axle 32 with the aid of ball bearings 423 interposed between the rotating inner rim surface 421 and the axle 32 surface. The interior surface 424 is preferably concentrically parallel to the outer perimeter surface 422 but could also be radially perpendicular to the outer perimeter surface 422 provided that the outer perimeter surface 422 and the interior surface are in fluid-communication via the plurality of fluid distribution disc channels 426 and the bearings 423 remain in contact with a fluid distribution disc 42 surface and the axle 32. Further, "interior" as used to describe the interior surface 424 refers merely to a location on a radial portion of the fluid distribution disc 42 that is not on the outer perimeter surface. FIGS. 4B–4C illustrate a preferred fluid distribution disc 42 assembly. The preferred fluid distribution disc 42 assembly includes an outer perimeter band 418 into which the tines 60 are securable and an inner disc 419 that supplies the bulk of the mass of the fluid distribution disc 42 and to which the bushing 44 is securable.

Figure 6A:
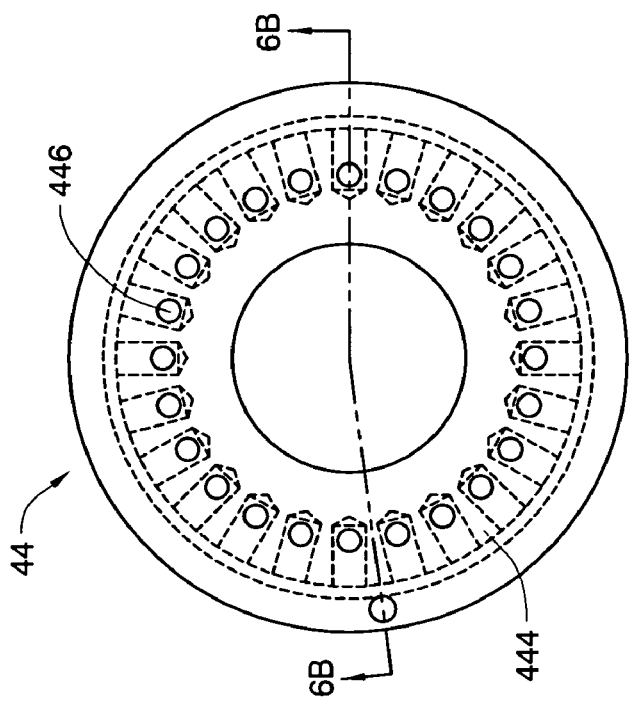
FIG. 6A illustrates a side view of a bushing 44.

The bushing 44 has a plurality of bushing channels 446 and is securable to the fluid distribution disc 42 wherein at least a portion of the bushing surface is adjacent to the fluid distribution interior surface 424 and the bushing channels 446 and the fluid distribution disc channels 426 are in fluid-communication. The preferred bushing 44 is illustrated in FIG. 6A and is disc shaped and composed of nylon or other equivalent material that is resilient and slick relative to the coincident or contacting metal surface of the disc valve 46. The preferred bushing 44 structure further comprises a bushing perimeter surface 442 and a bushing radial surface 444 in fluid-communication via the plurality of bushing channels 446. Thus, the plurality of bushing channels 446 within the bushing 44 substantially comprise an elbow structure that are accessible via the bushing radial surface 444. The bushing 44 also has an aperture though its origin to receive the axle 32.

Figure 7C:
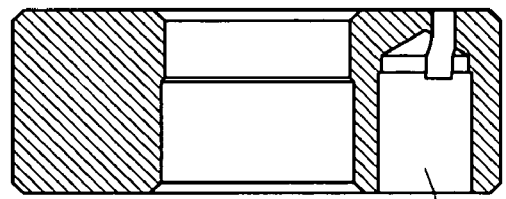
FIG. 7C illustrates a second cutaway of the disc valve 46.
Figure 7A:
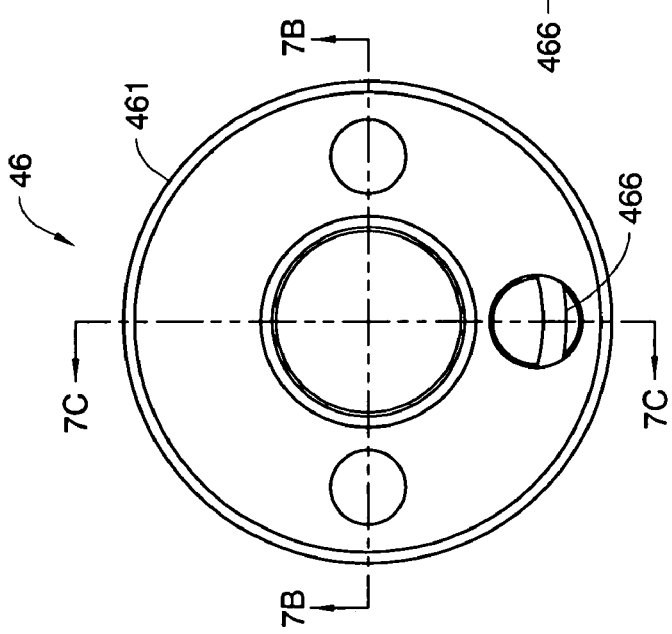
FIG. 7A illustrates a side view of a first side of a disc valve 46.

The plate or disc valve 46 is biased against the bushing 44, and in particular the bushing radial surface 444. The preferred disc valve 46 illustrated in FIG. 7A–7C and is disc shaped and comprises a disc valve perimeter surface 461, a disc valve radial surface 462, and an opposite radial disc valve surface 464. The disc valve 46 further has an aperture through its origin to receive the axle 32.

The disc valve 46 is biased against and in rotational contact with the bushing 44, and is also rotationally coupled to the fluid distribution disc interior surface 424 via bearings or rollers 463 interposed between the disc valve perimeter surface 461 and fluid distribution disc interior surface 424. The disc valve 46 further comprises a disc valve channel 466 that provides fluid communication between the disc valve radial surface 462 and the opposite radial disc valve surface 464. Thus, the disc valve channel 466 periodically aligns with, and is in fluid communication with, each of the bushing channels 446 as the fluid distribution disc 42 rotates about the axle 32. Accordingly, the disc valve channel 466 experiences fluid-communication sequentially with each of the plurality of fluid distribution disc channels 426.

Figure 7B:
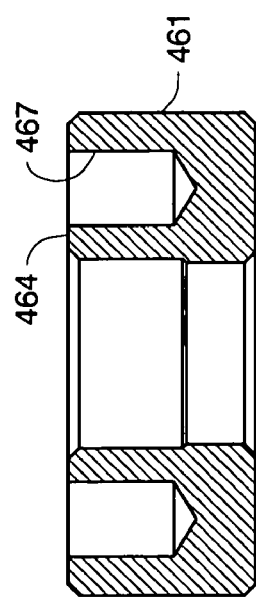
FIG. 7B illustrates a cutaway of the disc valve 46.
Figure 7D:
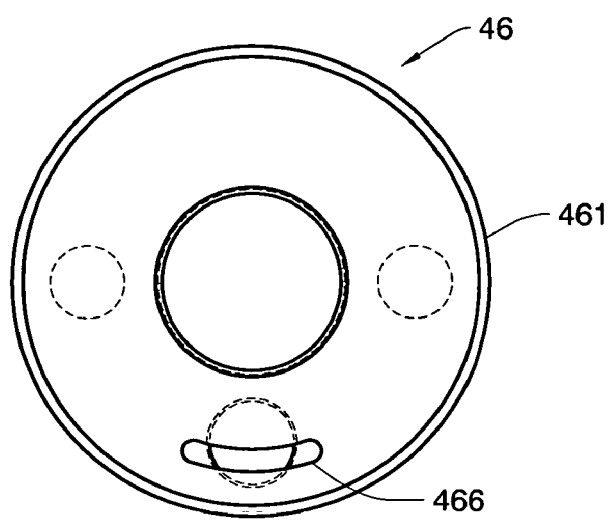
FIG. 7D illustrates a side view of a second side of the disc valve 46.

The preferred disc valve channel 466 is depicted in FIG. 7B and comprises a narrowing cylindrical volume such that the disc valve channel 466 aperture on the opposite radial disc valve surface 464 is wider than the disc valve channel 466 aperture on the disc valve radial surface 462. The narrowing cylindrical volume augments the fluid pressure within the disc valve channel 466. The preferred manner of biasing the disc valve 46 against the bushing 44 is using at least two sources of biasing force. Springs 468 partially recessed within the opposite radial disc valve surface 464 in spring wells 467 are biased from against the hub 50 and supply the biasing forces. The at least two biasing forces are preferably applied on the opposite radial disc valve surface 464 one-hundred eighty degrees (180 deg.) apart on opposite sides of the axle 32.

As the fluid distribution disc 42 rotates, the disc valve channel 426 periodically aligns with each bushing channel 446. The relatively low resistance to fluid flow through an aligned bushing channel 446 and disc valve channel 426, and the biasing of the disc valve radial surface 462 against the bushing radial surface 444 results in a fluid sealing junction between the disc valve radial surface 464 and the bushing radial surface 444, with a intermittent fluid flow path between the disc valve 46 and the bushing 44.

Figures 8A, 8B:
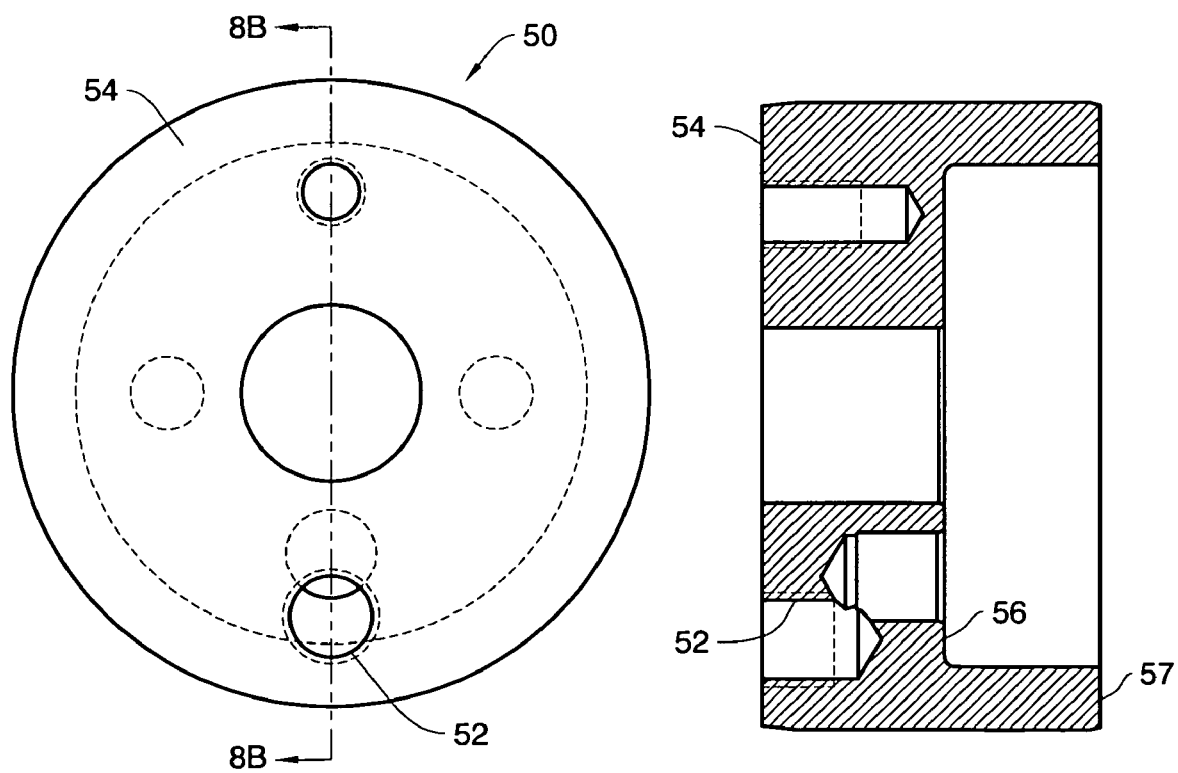
FIG. 8A illustrates a x-ray side view of a hub 50.
FIG. 8B illustrates a cutaway view of the hub 50.
Figure 9:
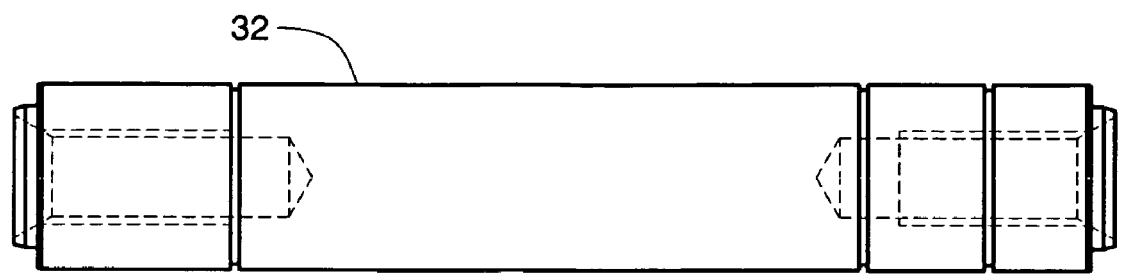
FIG. 9 illustrates a x-ray side view of an axle 32.
Figure 10:
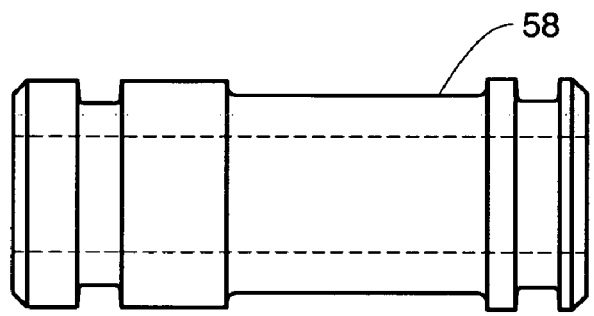
FIG. 10 illustrates a x-ray view of a hub tube 54.
Figure 11:
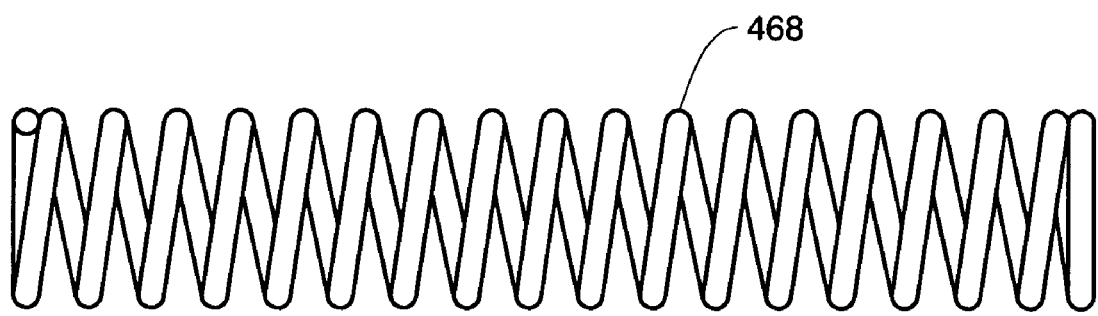
FIG. 11 illustrates a hub spring 56.

The preferred hub 50 is illustrated in FIGS. 8A–8B and has an hub outer radial surface 54 and a hub inner radial surface 56 in fluid communication via a hub fluid port 52.

The preferred hub fluid port 52 comprises two cylindrical volumes characterized by two cylindrically shaped volumes with radii that partially overlap within the body of the hub 50. Further, a hub tube 58 is interposed between and partially within the hub fluid port 52 and the disc valve channel 466 volumes. The hub inner radial surface 56 also has a lip 57 that concentrically receives the disc valve perimeter surface 461. Finally, the hub 50 is held in place over the axle 32 and against the disc valve 46 with a bolt that is secured through the arm assembly 20.

Figure 12:
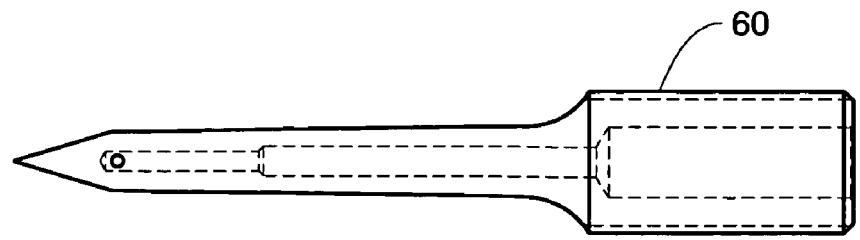
FIG. 12 illustrates a tine 60.
Figure 13A:
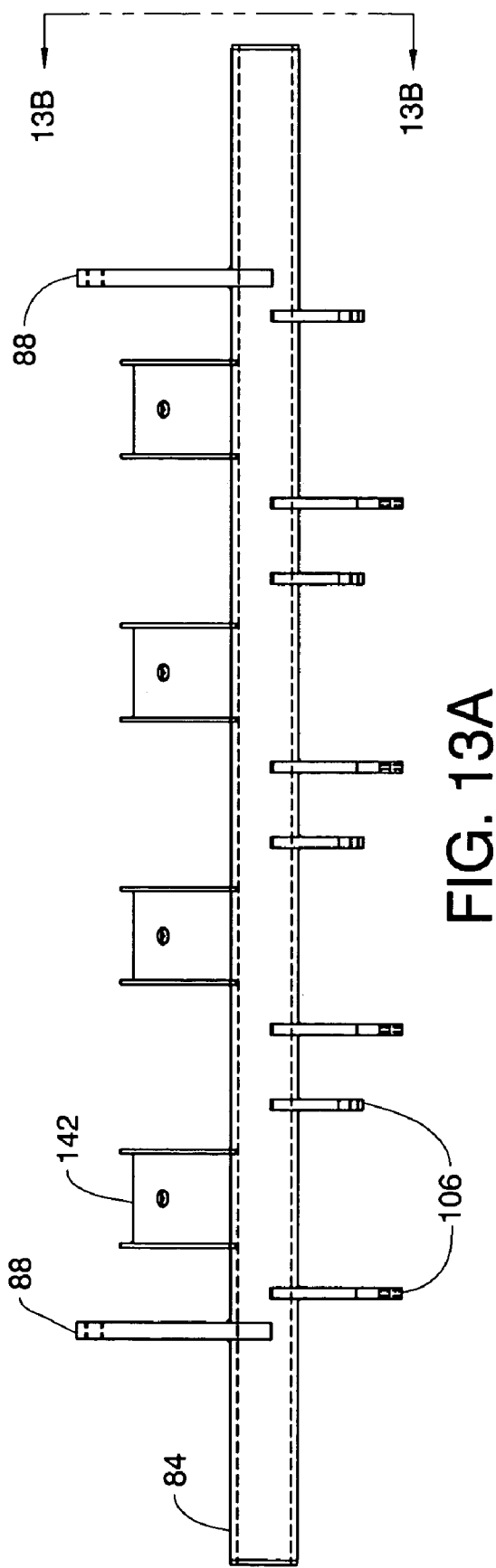
FIG. 13A illustrates a front view of a forward lift assembly shaft 104.
Figure 13B:
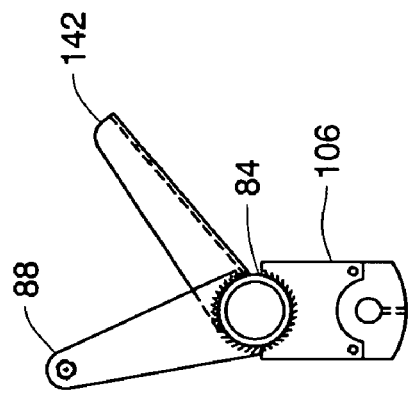
FIG. 13B illustrates a side view of the forward lift assembly shaft 104.

At least one, but preferably a plurality of, fluid injection tines 60 are coupled to the fluid distribution disc channels 426 via apertures in the fluid distribution disc perimeter surface 461. Each tine 60 comprises a substantially conical structure and has a tine channel 62 extending inside from the base portion to the tip of the conical structure as illustrated in FIG. 12. It is preferred that the base portions of the tines 60 are threaded to match that of apertures in the disc valve perimeter surface 461 that access each of the fluid distribution disc channels 426. Each tine 60 is constructed from a sturdy metal and penetrates the surface of the ground when the fluid distribution disc 42 is rolling over the surface of the ground. It is further preferred that the base portion of the tine 60 have a structure suitable for receipt of a wrench used to tighten and loosen the tine 60 from the fluid distribution disc 42. As illustrated in FIG. 5B, it is preferred that each fluid distribution disc 42 have two rows of tines 60 extending from the disc valve perimeter surface 461 are preferably offset on a diagonal on the disc valve perimeter surface 461 to improve the distribution of fluid into the ground from the fluid distribution disc 42.

Figure 16:
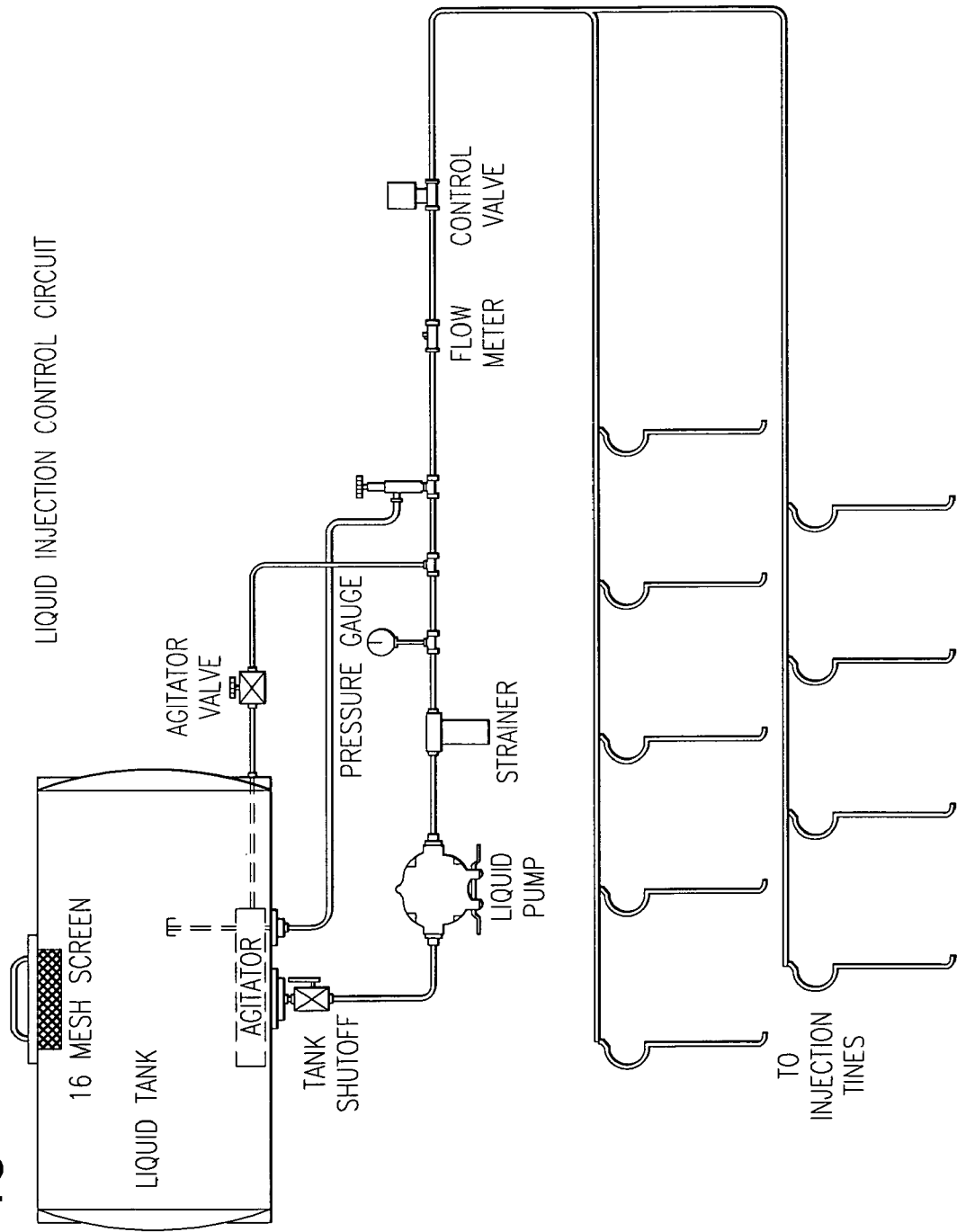
FIG. 16 illustrates a fluid distribution circuit.

A fluid reservoir 110 is attached to the frame and is coupled to the hub fluid ports 52 of each fluid distribution disc by way of a fluid distribution circuit as illustrated in FIG. 16. The fluid distribution circuit comprises several components to assist in the efficient to distribution of fluid to the fluid distribution discs 42. Particularly, at least one controllable valve is included in the fluid distribution circuit for controllably porting fluid from the fluid reservoir 110 to each of the hub fluid ports 52.

Figure 14C:
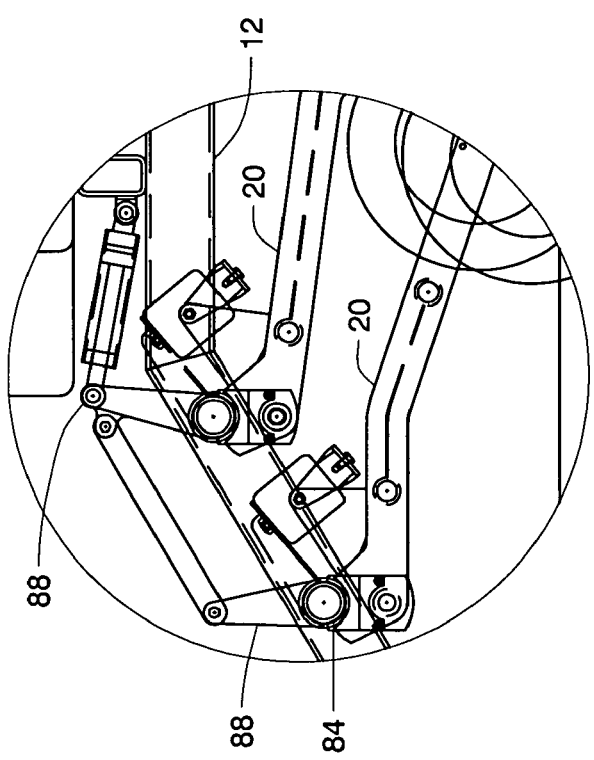
FIG. 14C illustrates specific detail of the means for lifting the arm assemblies 20 of the second alternative embodiment of the apparatus.
Figure 14B:
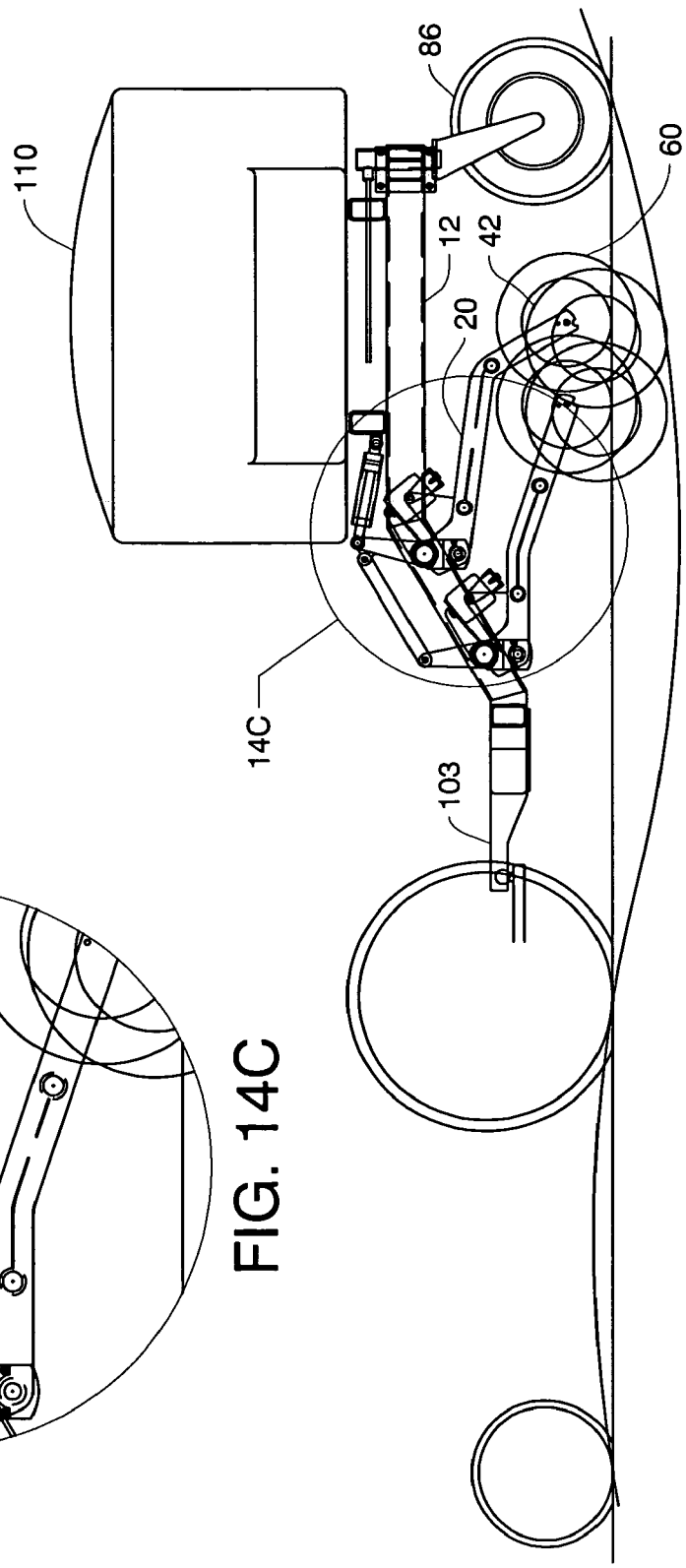
FIG. 14B illustrates a side view of the second alternative embodiment of the apparatus in fluid injection orientation characterized by the fluid distribution discs 42 contacting the ground surface 2.

Although FIGS. 1A–1C illustrate a first preferred alternative for a fluid injection apparatus, several alternative fluid injection apparatus designs are capable of incorporating aspects of the invention. FIGS. 14A–14C illustrate a second preferred alternative for a fluid injection apparatus. The second preferred alternative design also uses a frame comprising first and second longitudinal frame beams 12. However, the first and second longitudinal frame beams 12 extend longitudinally rearward initially at a slight upward angle and then substantially horizontally to form a base upon which the fluid reservoir 110 is supported at rearward portions of the longitudinal frame beams 12. Two or more wheels 84 are coupled to the distal end portions of the longitudinal frame beams 12 to assist transport of the apparatus.

The second alternative embodiment also has both a fluid injection orientation and a traveling orientation. Similarly to the previous embodiment, the second embodiment fluid injection orientation is characterized by the arm assemblies 20 pivotally suspended from the lift assembly shaft 84 and the fluid distribution discs 42 and tines 60 connected thereto in contact with the ground surface. Manipulating the fluid distribution discs 42 into or out of contact with the ground surface is facilitated by two controllable hydraulic cylinders 82. The controllable hydraulic cylinders 82 are secured to the medial horizontal portions of the longitudinal frame beams 12 and oriented to extend the piston in a forward longitudinal direction.

A first lever arm 88 and a second lever arm 88 extend substantially vertically from the rear and forward lift assembly shafts 84, respectively, and pivotally connect with the hydraulic cylinder 82 pistons. A lever arm extension 89 is coupled to the second lever arm 88 and extends rearward and upward to pivotally connect with the hydraulic cylinder 82 pistons. Extending the hydraulic cylinder 82 piston will force the lever arms 88 in a forward direction thereby rotating the rear and forward lift assembly shafts 84 in a counterclockwise direction and lifting the arm assemblies 20 and the fluid distribution discs 42 attached thereto off of the ground. Alternatively, compressing the hydraulic cylinder 82 piston will permit rear and forward lift assembly shafts 84 to rotate clockwise and lower the arm assemblies 20 and the fluid distribution discs 42 onto the ground.

Figure 15A:
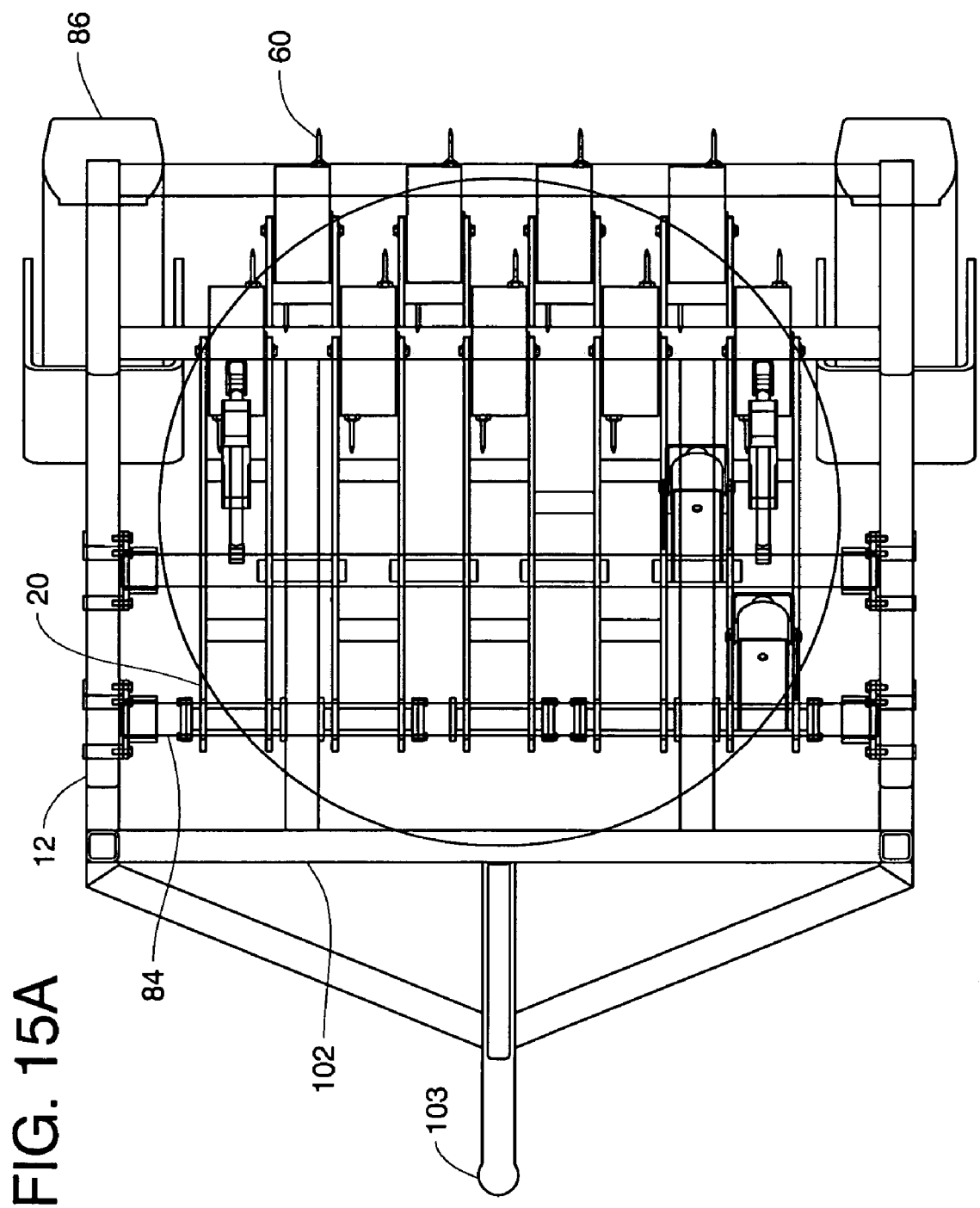
FIG. 15A illustrates a top view of the third alternative embodiment of the apparatus.
Figure 15B:
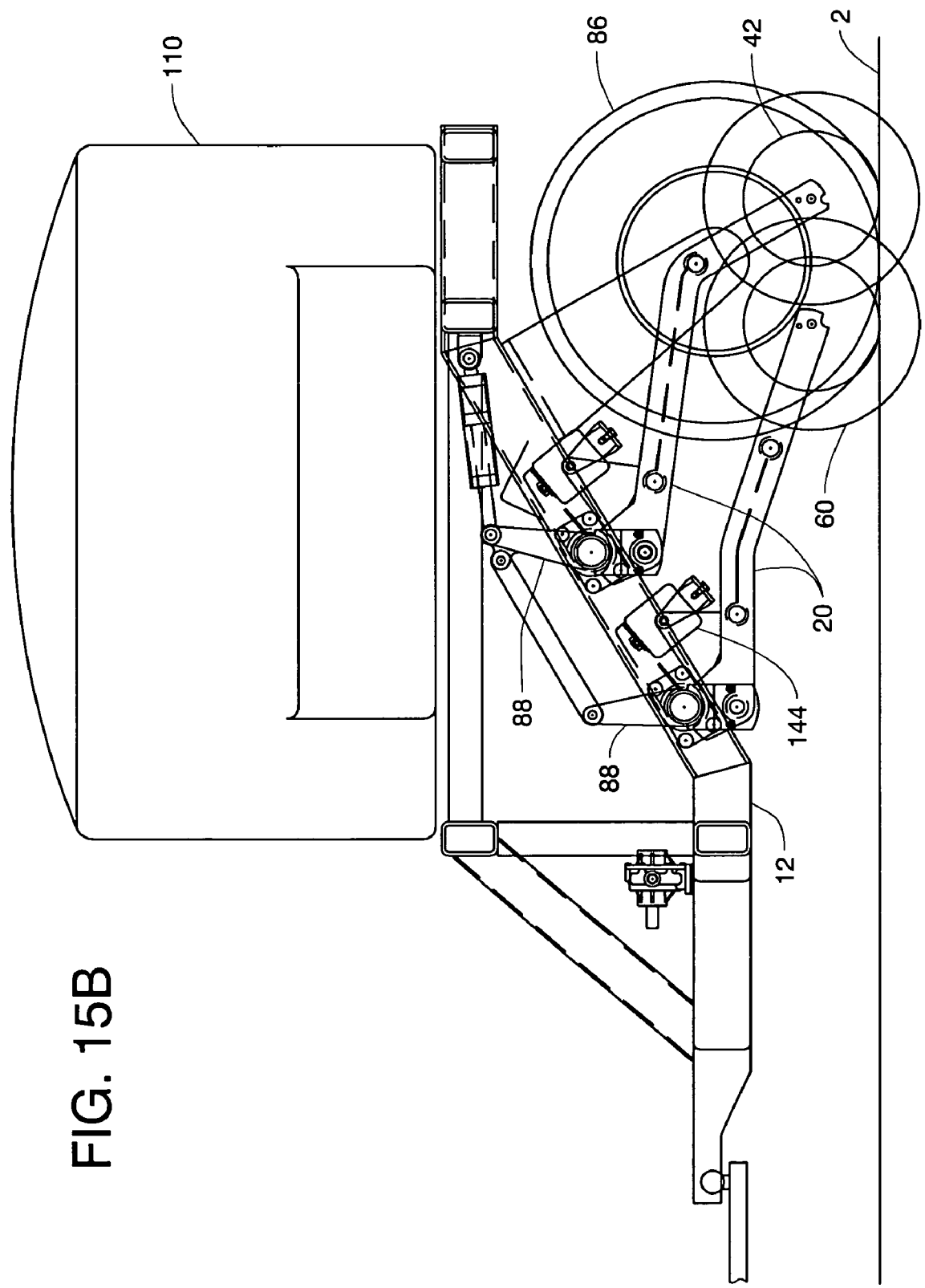
FIG. 15B illustrates a side view of the second alternative embodiment of the apparatus in fluid injection orientation characterized by the fluid distribution discs 42 contacting the ground surface 2.

FIGS. 15A–15B illustrate yet a third alternative of the fluid injection apparatus. The third preferred alternative design also has a frame comprising first and second longitudinal frame beams 12. The first and second longitudinal frame beams 12 extend longitudinally rearward at a slight upward angle and then join with horizontally oriented frame beams 108 which are supported by vertically oriented braces 109 secured to and extending upward from the forward frame brace 102. The fluid reservoir 110 is positioned atop the horizontally oriented frame beams 108. Two or more wheels 84 are coupled to the distal end portions of the first and second longitudinal frame beams 12 using supports 111 that extend diagonally downward from of the longitudinal frame beams 12 to assist transport of the apparatus. The arm assemblies 20 and fluid distribution discs 42 are raised and lowered to not contact and to contact the ground surface in a manner and by hardware similar to the second embodiment described above.

Bleed Groove for Leakage Embodiment

As previously disclosed, one purpose of the fluid injection apparatus is to pump fluid from the fluid reservoir 100, through the fluid distribution circuit, and ultimately into the ground via the tines 60. Among other things, the fluid may contain, polymers, nutrients, fertilizers and other compounds. Any leakage of fluid would be undesirable because it would waste the fluid to be injected. In addition, leakage onto the ground surface may be unsightly, slippery and damage vegetation on the ground surface, among other things.

Figure 6B:
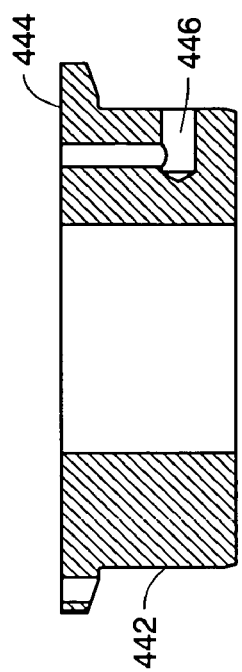
FIG. 6B illustrates a cutaway of the bushing 44.

One location where fluid leakage can occur is the between the disc valve radial surface 462 and the bushing radial surface 444. As previously described, the disc valve channel 466 periodically aligns with, and is in fluid communication with, each of the bushing channels 446 as the fluid distribution disc 42 rotates about the axle 32. See FIGS. 4, 6 and 7. Accordingly, the disc valve channel 466 experiences fluid-communication sequentially with each of the plurality of fluid distribution disc channels 426. To accomplish this, the bushing radial surface 444 rotates relative to the disc valve radial surface 462.

Figure 17:
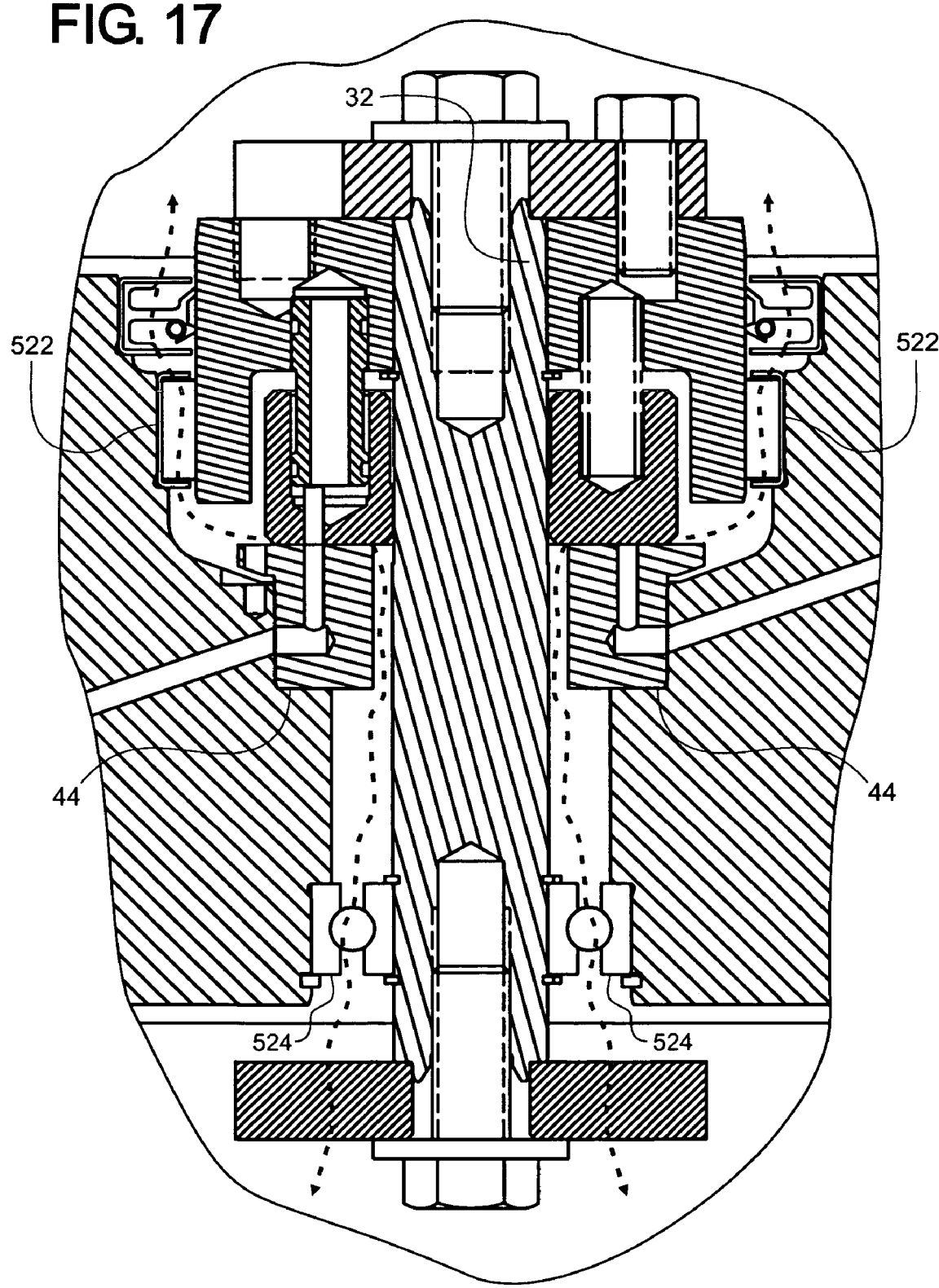
FIG. 17 illustrates an enlarged view of the side view cutaway of a fluid distribution disc 42 shown in FIG. 4A.

As previously described, leakage can be minimized (or possibly even eliminated) by using very smooth, flat (and usually expensive) surfaces for the interface between the disc valve radial surface 462 and the bushing radial surface 444 as well as biasing the disc valve 46 against the bushing 44. Even still, some leakage could occur. When leakage occurs, it generally occurs as shown in FIG. 17. Fluid leaks its way onto the outer portion of the hub and into the roller bearing 522 and down between the axel 32 and the inside of the bushing 44 and the roller center.

Figure 18:
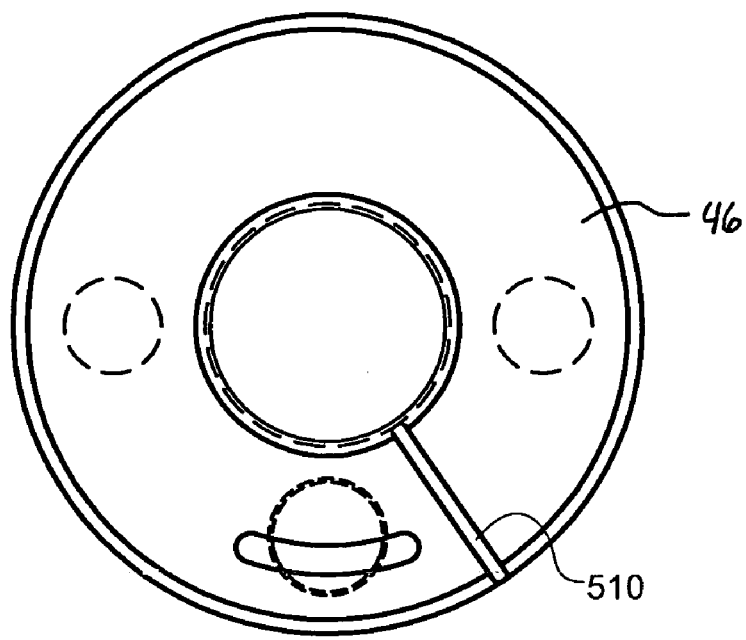
FIGS. 18 and 18A illustrate an embodiment of a disc valve 46 having a bleed groove 510.
Figure 18A:
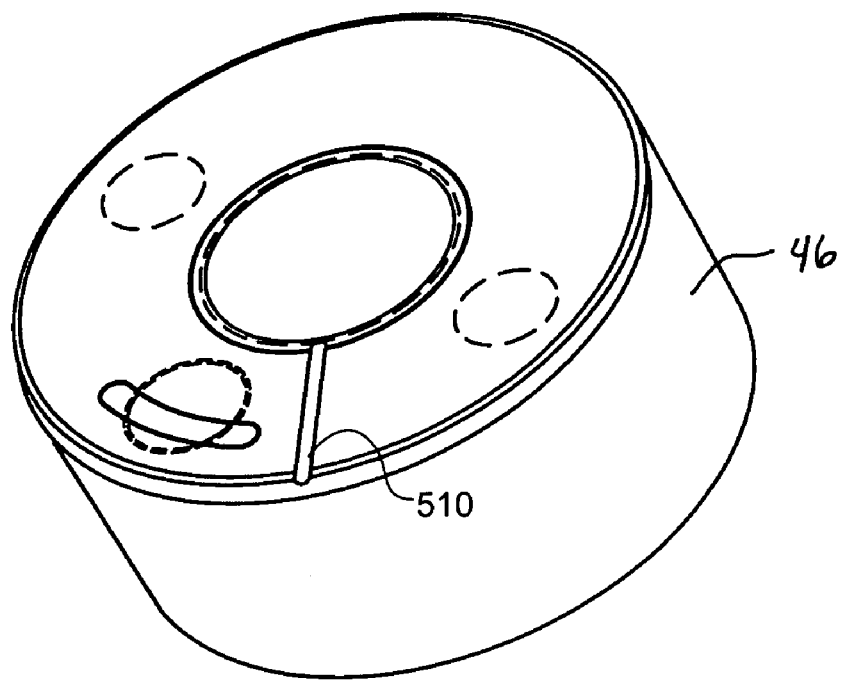

As an alternative to trying to stop all leakage, the following embodiment describes how to control leakage by redirecting the leakage back through the bushing channels 446 by adding a bleed groove 510. See FIGS. 18 and 18A. It is preferred to locate the bleed groove 510 on the disc valve 46 as shown in FIG. 18. It is preferred that the bleed groove 510 be just big enough to handle the leak-off flow but not any larger than necessary. When used with the embodiment depicted in the drawings, a bleed channel that is semicircular in cross section with a radius of 0.02 inches is preferred. It is preferred that the bleed groove 510 not communicate with the disc valve channel 466.

In addition to adding the bleed groove 510, it is preferred to change the roller bearing 522 to a large ball bearing 530 with seals. It is also preferred to add a first seal 532 and a second seal 534. Any type of seal known in the art should work, but it is preferred to use a radial lip seal with pre-load springs installed so that increased pressure adds to the sealing force. The first seal 532 prevents fluid from getting on the outside of the hub and to the large ball bearing 522. The second seal 534 prevents fluid from getting down into the area between the axle 32 and the bushing 44. A leakage accumulation chamber 520 is formed by the volume between the first seal 532 and the second seal 534 inside the hub.

It is believed that as fluid leaks into and builds up in the leakage accumulation chamber 520, some air is compressed and creates a small pressure. As the fluid leakage begins to accumulate, some air drains through the bleed groove 510. As fluid accumulation increases in the accumulation chamber 520, air compresses slightly more and fluid drains off through the bleed groove 510.

Figure 19:
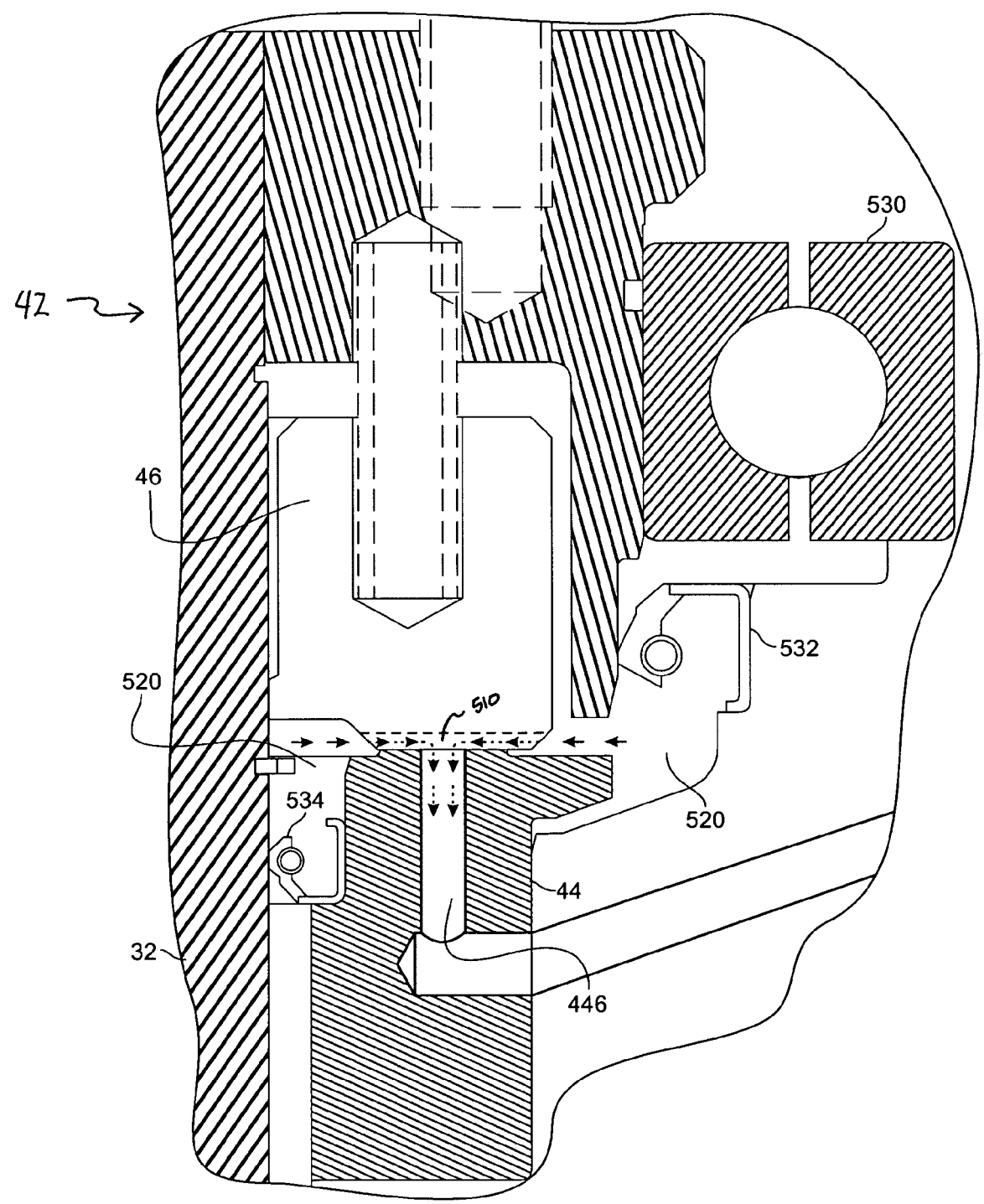
FIG. 19 illustrates an alternate embodiment of a fluid distribution disc 42 with a bleed groove 510 embodiment.
Figure 20:
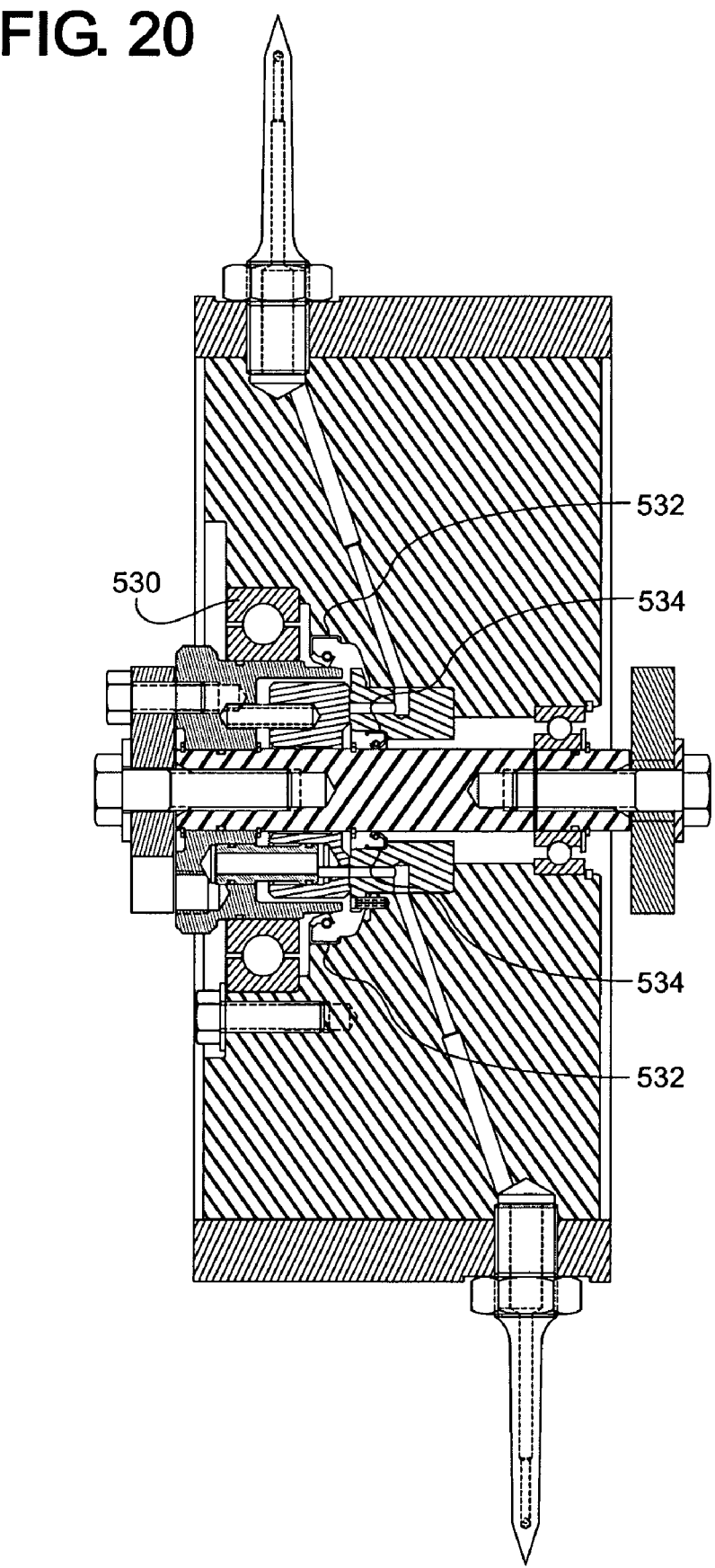
FIG. 20 illustrates an alternate embodiment of a fluid distribution disc 42 with a bleed groove 510 embodiment.

As shown in FIG. 19, the flow from the leakage accumulation chamber 520 comes inward from the outside diameter of the interface between the disc valve radial surface 462 and the bushing radial surface 444. The flow from the leakage accumulation chamber 520 also comes and outward from inside diameter of outside diameter of disc valve radial surface 462 and the bushing radial surface 444. These drainage flows combine and flow into the bushing 44 as the bleed groove 510 sequentially passes over bushing channel 446.

It is preferred to locate the bleed groove 510 on the disc valve radial surface 462 so that each bushing channel 446 passes the bleed groove 510 after the tine 60 has penetrated the ground and before the main flow occurs. One of the benefits of this design is that the fluid leakage from the interface between the disc valve radial surface 462 and the bushing radial surface 444 redirected back into the tine 60 and under ground level not onto the ground or the fluid injection apparatus itself.

Although the invention has been described in detail with reference to one or more particular preferred embodiments, persons possessing ordinary skill in the art to which this invention pertains will appreciate that various modifications and enhancements may be made without departing from the spirit and scope of the claims that follow.

What is claimed is:

1. A fluid distribution assembly, comprising:
   an axle;
   a fluid distribution disc rotationally coupled to the axle;
   a bushing having a bushing channel, the bushing coupled to the fluid distribution disc;
   a disc valve in contact with the bushing, the disc valve having a disc valve channel that is periodically in fluid communication with the bushing channel; and
   a bleed groove housed within the fluid distribution disc.

2. The fluid distribution assembly in claim 1 wherein, the bleed groove is not in fluid communication with the disc valve channel.

3. The fluid distribution assembly in claim 2 wherein, the bleed groove is located on a face of the disc valve in contact with the bushing.

4. The fluid distribution assembly in claim 3 further comprising:
   a first seal and a second seal forming a leakage accumulation chamber between the first seal and an interface between the bushing and the disc valve and between the second seal and the interface between the bushing and the disc valve.

5. The fluid distribution assembly in claim 4 further comprising:
   a tine radially connected to the fluid distribution disc, and wherein the bleed groove is in periodic fluid communication with the tine.

6. The fluid distribution assembly in claim 4 further comprising:
   a plurality of tines radially connected to the fluid distribution disc, and wherein the bleed groove is in periodic fluid communication with a tine.

* * * * *